United States Patent
Kojima et al.

(10) Patent No.: US 8,960,654 B2
(45) Date of Patent: Feb. 24, 2015

(54) VIBRATION ISOLATION DEVICE

(75) Inventors: Hiroshi Kojima, Yokohama (JP); Akio Shimamura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 260 days.

(21) Appl. No.: 13/387,677

(22) PCT Filed: Jul. 27, 2010

(86) PCT No.: PCT/JP2010/062624
§ 371 (c)(1),
(2), (4) Date: Jan. 27, 2012

(87) PCT Pub. No.: WO2011/013665
PCT Pub. Date: Feb. 3, 2011

(65) Prior Publication Data
US 2012/0126090 A1    May 24, 2012

(30) Foreign Application Priority Data

Jul. 28, 2009  (JP) .................................. 2009-175674
Jul. 28, 2009  (JP) .................................. 2009-175675
Mar. 5, 2010   (JP) .................................. 2010-049240

(51) Int. Cl.
F16F 5/00    (2006.01)
F16F 13/16   (2006.01)
(Continued)

(52) U.S. Cl.
CPC ............. *F16F 13/16* (2013.01); *F16F 13/10* (2013.01); *F16F 13/105* (2013.01); *F16F 13/1463* (2013.01)
USPC ................... 267/140.11; 267/140.13; 248/562

(58) Field of Classification Search
USPC ................. 267/140.11–140.13, 140.3–140.5; 248/562, 566, 573, 634
See application file for complete search history.

(56) References Cited

U.S. PATENT DOCUMENTS 6,585,242 B2 *  7/2003  Kodama et al. .......... 267/140.13
7,314,213 B2 *  1/2008  Tanaka ....................... 267/140.5
(Continued)

FOREIGN PATENT DOCUMENTS

JP    2002-310222 A    10/2002
JP    2006-064033 A    3/2006
(Continued)

OTHER PUBLICATIONS

Japanese Office Action issued in Japanese Application No. 2010-049240 dated Nov. 19, 2013.

*Primary Examiner* — Alfred J Wujciak
(74) *Attorney, Agent, or Firm* — Sughrue Mion, PLLC

(57) ABSTRACT

Provided is a vibration isolation device including: a first attachment member formed in a tubular shape; a second attachment member disposed at the inner peripheral side of the first attachment member; a resilient body coupled to the first attachment member and the second attachment member; a partitioning member configuring a first main liquid chamber between the partitioning member and the resilient body; a diaphragm member configuring an auxiliary liquid chamber between the diaphragm member and the partitioning member; a first restricting through path enabling liquid to move between the first main liquid chamber and the auxiliary liquid chamber; a recess portion provided to the resilient body and configuring a liquid chamber between the recess portion and the first attachment member; a separating wall sectioning the liquid chamber into a plurality of second main liquid chambers; a second restricting through path; and pressure difference reduction portion.

8 Claims, 23 Drawing Sheets

(51) Int. Cl.
*F16F 13/10* (2006.01)
*F16F 13/14* (2006.01)

(56) References Cited

U.S. PATENT DOCUMENTS

| | | | |
|---|---|---|---|
| 8,231,116 B2* | 7/2012 | Nishi | 267/140.13 |
| 8,302,946 B2* | 11/2012 | Kojima et al. | 267/140.13 |
| 2004/0150146 A1* | 8/2004 | Takeo et al. | 267/140.14 |
| 2006/0043657 A1* | 3/2006 | Tanaka | 267/140.11 |
| 2006/0043658 A1* | 3/2006 | Tanaka et al. | 267/140.13 |
| 2006/0091594 A1* | 5/2006 | Miyahara | 267/140.13 |
| 2006/0125162 A1* | 6/2006 | Tashiro | 267/140.14 |
| 2008/0054152 A1* | 3/2008 | Maeno et al. | 248/562 |
| 2010/0264569 A1* | 10/2010 | Kojima | 267/140.11 |
| 2011/0042870 A1* | 2/2011 | Kojima | 267/140.11 |
| 2012/0292838 A1* | 11/2012 | Yamamoto et al. | 267/140.13 |

FOREIGN PATENT DOCUMENTS

| | | |
|---|---|---|
| JP | 2006-064119 A | 3/2006 |
| JP | 2006-125617 A | 5/2006 |
| JP | 2006-291990 A | 10/2006 |
| JP | 2007-032745 A | 2/2007 |
| JP | 2007-139048 A | 6/2007 |

* cited by examiner

VIBRATION ISOLATION DEVICE

CROSS REFERENCE TO RELATED APPLICATIONS

This application is a National Stage of International Application No. PCT/JP2010/062624 filed Jul. 27, 2010, which claims priority from Japanese Patent Application Nos. 2009-175674 filed Jul. 28, 2009 and 2009-175675 filed Jul. 28, 2009 and 2010-049240 filed Mar. 5, 2010, the contents of all of which are incorporated herein by reference in their entirety.

TECHNICAL FIELD

The present invention relates to a liquid filled vibration isolation device for preventing transmission of vibration from a vibration generating member, and in particular to a vibration isolation device preferably employed such as in an engine mount for a vehicle.

BACKGROUND ART

Vibration isolation devices are, for example, disposed in vehicles such as cars as engine mounts between a vibration generating unit of an engine and a vibration receiving unit of the vehicle body. In such a vibration isolation device, when vibration occurs in the axial direction between an internal cylinder and an external cylinder due to vibration generated from the engine, vibration is attenuated by liquid moving between a first main liquid chamber and an auxiliary liquid chamber. For example the vibration isolation device described in Japanese Patent Application Laid-Open (JP-A) No. 2006-125617 is also configured with two pressure bearing liquid chambers (liquid chambers) disposed in a direction orthogonal to the axial direction (axis-orthogonal direction), in addition to the above structure. The pressure bearing liquid chambers are in communication with the auxiliary liquid chamber, such that vibration in the axis-orthogonal direction is attenuated by liquid moving between plural liquid chambers.

However, in such vibration isolation devices structured to enable vibration attenuation in two directions (axial direction and axis-orthogonal direction), it is desirable to lower the kinetic spring constants for vibrations at high frequency in both the two directions.

DISCLOSURE OF INVENTION

Technical Problem

In consideration of the above circumstances the present invention is directed towards a vibration isolation device for attenuating vibration not only in the axial direction but also in an axis-orthogonal direction orthogonal to the axial direction, to obtain a vibration isolation device capable of lowering the kinetic spring constants in the two directions.

Solution to Problem

A first aspect of the present invention is a vibration isolation device including: a first attachment member formed in a tubular shape and coupled to a vibration generating unit or to a vibration receiving unit; a second attachment member coupled to the other of the vibration generating unit or the vibration receiving unit and disposed at the inner peripheral side of the first attachment member; a resilient body disposed between the first attachment member and the second attachment member and coupled to the first attachment member and the second attachment member; a partitioning member configuring a first main liquid chamber between the partitioning member and the resilient body, the first main liquid chamber filled with a liquid from a main vibration input direction first end side of the second attachment member, and the internal volume of the first main liquid chamber changing along with resilient deformation of the resilient body; a diaphragm member configuring an auxiliary liquid chamber between the diaphragm member and the partitioning member, the auxiliary liquid chamber filled with liquid and the internal volume of the auxiliary liquid chamber changing according to liquid pressure fluctuations; a first restricting through path enabling liquid to move between the first main liquid chamber and the auxiliary liquid chamber; a recess portion provided to the resilient body and configuring a liquid chamber between the recess portion and the first attachment member; a separating wall sectioning the liquid chamber into plural second main liquid chambers in a row along a direction orthogonal to the axial direction of the first attachment member; a second restricting through path enabling liquid to move in-between the plural second main liquid chambers and/or between each of the second main liquid chambers and the auxiliary liquid chamber; and pressure difference reduction means that reduces the pressure difference between the first main liquid chamber and the second main liquid chambers.

In this vibration isolation device, when vibration from the vibration generating unit is transmitted to either the first attachment member or the second attachment member, the resilient body disposed between and coupling the first attachment member and the second attachment member resiliently deforms. The vibration is then absorbed by for example a vibration absorbing action based on internal friction of the resilient body, and the vibration transmitted to the vibration receiving unit side is reduced.

The first main liquid chamber configured between the resilient body and the partitioning member, and the auxiliary liquid chamber configured between the partitioning member and the diaphragm member, are respectively filled with liquid, and movement of liquid between the first main liquid chamber and the auxiliary liquid chamber is enabled by the first restricting through path. Accordingly, when the first attachment member and the second attachment member vibrate along the axial direction, the internal volume of the first main liquid chamber changes with the resilient deformation of the resilient body, and as some of the liquid moves to-and-fro between the auxiliary liquid chamber, the input vibration (in the main vibration amplitude direction) can be absorbed.

Also in this vibration isolation device, a liquid chamber is configured between the recessed portion provided to the resilient body and the first attachment member, and the liquid chamber is sectioned into plural second main liquid chambers in a row along a direction orthogonal to the axial direction of the first attachment member by a separating wall. Also, the movement of liquid in-between the plural second main liquid chambers and/or between each of the second main liquid chambers and the auxiliary liquid chamber is enabled by the second restricting through path. Accordingly, when the first attachment member and the second attachment member vibrate along a direction orthogonal to the axial direction (axis-orthogonal direction), liquid moves in-between the plural second main liquid chambers and/or between each of the second main liquid chambers and the auxiliary liquid chamber. For this reason, input vibration can also be absorbed in the axis-orthogonal direction.

In particular, liquid moves between the second main liquid chambers and the auxiliary liquid chamber as the internal volume of the auxiliary liquid chamber changes in response to changes in the liquid pressure. Furthermore, liquid movement can be readily induced between the second main liquid chambers and the auxiliary liquid chamber when movement is enabled by the second restricting through path, and it is possible to reliably carry out absorption of the input vibration. However, since the second main liquid chambers are in communication with the auxiliary liquid chamber through the second restricting through path, liquid movement is induced between the second main liquid chambers and the auxiliary liquid chamber without the second main liquid chambers being affected by each other.

In addition, in this vibration isolation device, the pressure difference between the first main liquid chamber and the second main liquid chambers is reduced by the pressure difference reduction means. In other words, "pressure release" with respect to the first main liquid chamber and the second main liquid chambers is achieved by the pressure difference reduction means. Therefore, the pressure difference between the first main liquid chamber and the second main liquid chambers is reduced by the pressure difference reduction means when high frequency vibrations are input along the axial direction (for example, vibrations such that the first restricting through path stops acting as a through movement path for the liquid). Therefore, the kinetic spring constant in the axial direction can be reduced. Similarly, the pressure difference between the first main liquid chamber and the second main liquid chambers is reduced by the pressure difference reduction means when high frequency vibrations are input along the axis-orthogonal direction, and so the kinetic spring constant in the axis-orthogonal direction can also be reduced.

In a second aspect of the present invention the pressure difference reduction means is provided to the separating wall.

By providing the pressure difference reduction means to the separating wall in this way, there is no requirement to provide a pressure difference reduction means to another site or member apart from the separating wall. Accordingly, it is possible to maintain the original function of the vibration isolation device.

In a third aspect of the present invention the pressure difference reduction means is configured by thin walled portions on both sides of a thinned portion formed by thinning from a thickness direction central portion of the separating wall out towards the first main liquid chamber.

Accordingly, pressure difference, that is to say, pressure fluctuation between the first main liquid chamber and the second main liquid chambers can be absorbed by the thin walled portions deforming. As the pressure difference reduction means can be configured simply by configuring thin walled portions by thinning the separating walls, there is little impact on the performance of the vibration isolation device overall, and the vibration isolation device can still maintain its original high vibration damping performance.

In a fourth aspect of the present invention the resilient body is formed in a truncated circular conical shape with a diameter that gradually widens as the resilient body extends out from the second attachment member towards the partitioning member. The resilient body includes: a circular conical portion that partitions between the first main liquid chamber and the second main liquid chambers and attenuates vibration by resilient deformation due to relative vibration in the axial direction of the first attachment member and the second attachment member; and a lid portion configuring a lid to the liquid chamber and extending from the second attachment member towards the radial direction outside at the opposite side to the partitioning member as viewed from the circular conical portion. The pressure difference reduction means is configured as a locally thinned portion in the circular conical portion.

By forming the truncated circular conical shaped circular conical portion on the resilient body, the first main liquid chamber can be configured as the space between the resilient body and the partitioning member. When there is relative vibration between the first attachment member and the second attachment member, the circular conical portion resiliently deforms as the main deforming body, with a vibration damping result. The circular conical portion acting as the main deforming body is also a resilient body in which a large volume is secured, so as well as exhibiting a high vibration damping effect, durability is also increased. Also, by configuring a lid to the liquid chamber with the lid portion that extends from the resilient body, the liquid chamber (the second main liquid chambers) between the recessed portion of the resilient body and the first attachment member can be reliably supported.

Furthermore, the pressure difference reduction means can be configured by the simple configuration of forming thinned portions by local thinning to the circular conical portion. The thinned portions are formed locally to the circular conical portion, and the thickness is maintained in the remainder of the circular conical portion besides the thinned portions. That is to say, the thickness of the circular conical portion that acts as the main deforming body is ensured, and a high vibration damping effect can be exhibited.

In a fifth aspect of the present invention the second attachment member is formed with a communication hole communicating the first main liquid chamber with the second main liquid chambers, and the pressure difference reduction means is configured by a thin membrane portion formed by the resilient body and partitioning the communication hole into a first main liquid chamber side and a second main liquid chambers side.

Accordingly, the pressure difference between the first main liquid chamber and the second main liquid chambers is reduced by deformation of the thin membrane portion in the communication hole that is partitioned into the first main liquid chamber side and the second main liquid chamber side. Since it is sufficient to form the communication hole in the second attachment member and form the thin membrane portion to partition the communication hole as the pressure difference reduction means, there is little impact on the performance of the vibration isolation device overall, and the vibration isolation device can maintain its original high vibration damping performance.

In a sixth aspect of the present invention the partitioning member is configured from a high rigidity partitioning member that does not deform due to pressure difference between the first main liquid chamber and the second main liquid chambers.

By thus configuring the partitioning member from a high rigidity partitioning member, unintentional deformation of the partitioning member can be suppressed when pressure difference arises between the main liquid chamber and the auxiliary liquid chamber. As an unintentional drop in the pressure of the first main liquid chamber caused by a deformation of the partitioning member is suppressed, it is possible to reliably reduce the pressure difference between the first main liquid chamber and the second main liquid chambers by means of the pressure difference reduction means.

Furthermore, it is possible to form a first restricting through path of sufficient length since a component to reduce the pressure difference between the first main liquid chamber and the auxiliary liquid chamber (for example a membrane) is not required to be provided on the partitioning member.

In a seventh aspect of the present invention the first restricting through path is formed at the peripheral inside and the second restricting through path is formed at the peripheral outside relative to each other in the high rigidity partitioning member.

This makes it possible to ensure sufficient length for both the first restricting through path and the second restricting through path.

In an eighth aspect of the present invention the pressure difference reduction means is configured by an open hollow portion formed to an internal portion of the separating wall so as not to be in communication with the first main liquid chamber or with the second main liquid chambers.

By thus configuring a hollow portion formed to an internal portion of the separating wall, the separating wall at the periphery of the hollow portion can deform readily, and excessive pressure difference between the plural second main liquid chambers can be easily absorbed. As pressure difference reduction means can be configured simply by forming the hollow to the separating wall, there is little impact to the performance of the vibration isolation device overall, and the vibration isolation device can maintain its original high vibration damping performance.

In a ninth aspect of the present invention the hollow portion is configured by a recessed portion that has a recessed shape in the main vibration input direction and is open to the second attachment member side.

A hollow portion can be easily configured by thus configuring as a recessed shape in the main vibration input direction that is open to the first attachment member side.

In a tenth aspect of the present invention the hollow portion is configured by a recessed portion that has a recessed shape in a direction orthogonal to the main vibration input direction and is open to the first attachment member side.

A hollow portion can be easily configured by thus configuring as a recessed shape in a direction orthogonal to the main vibration input direction that is open to the first attachment member side.

Advantageous Effects of Invention

Due to configuring the present invention as described above in a vibration isolation device for attenuating vibration not only in the axial direction but also in an axis-orthogonal direction orthogonal to the axial direction, the kinetic spring constants can be lowered in the two directions.

BEST MODE FOR CARRYING OUT THE INVENTION

First Exemplary Embodiment

Figure 1:
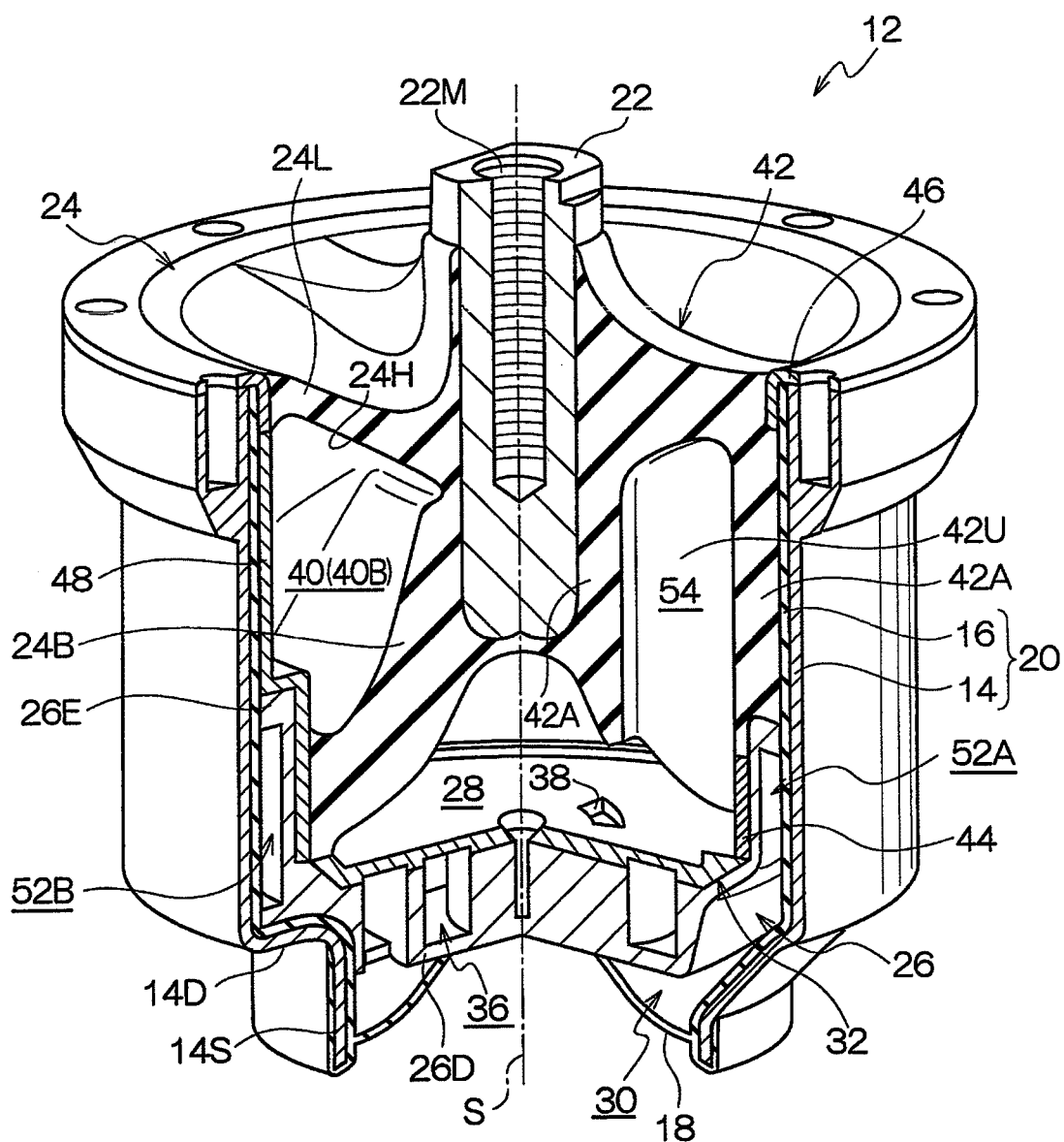
FIG. 1 is a perspective view of a configuration of a vibration isolation device according to the first exemplary embodiment of the present invention partially cut-away along the axial direction.

FIG. 1 illustrates a vibration isolation device 12 of a first exemplary embodiment of the present invention. The vibration isolation device 12 is, for example, employed as an engine mount in a vehicle. An engine that is a vibration generating unit is supported on a vehicle body that is a vibration receiving unit. The annotation S in the drawings indicates the axial center of the vibration isolation device 12. The direction along the axial center S is referred to as the axial direction of the vibration isolation device 12, and directions orthogonal to the axial center S (axis-orthogonal directions) are referred to as radial directions of the vibration isolation device 12. The direction along the axial center S is the main vibration input direction to the vibration isolation device 12, and a direction orthogonal to the axial center S (axis-orthogonal direction) is a vibration input direction to the vibration isolation device 12 in a direction orthogonal to the main vibration.

Figure 3:
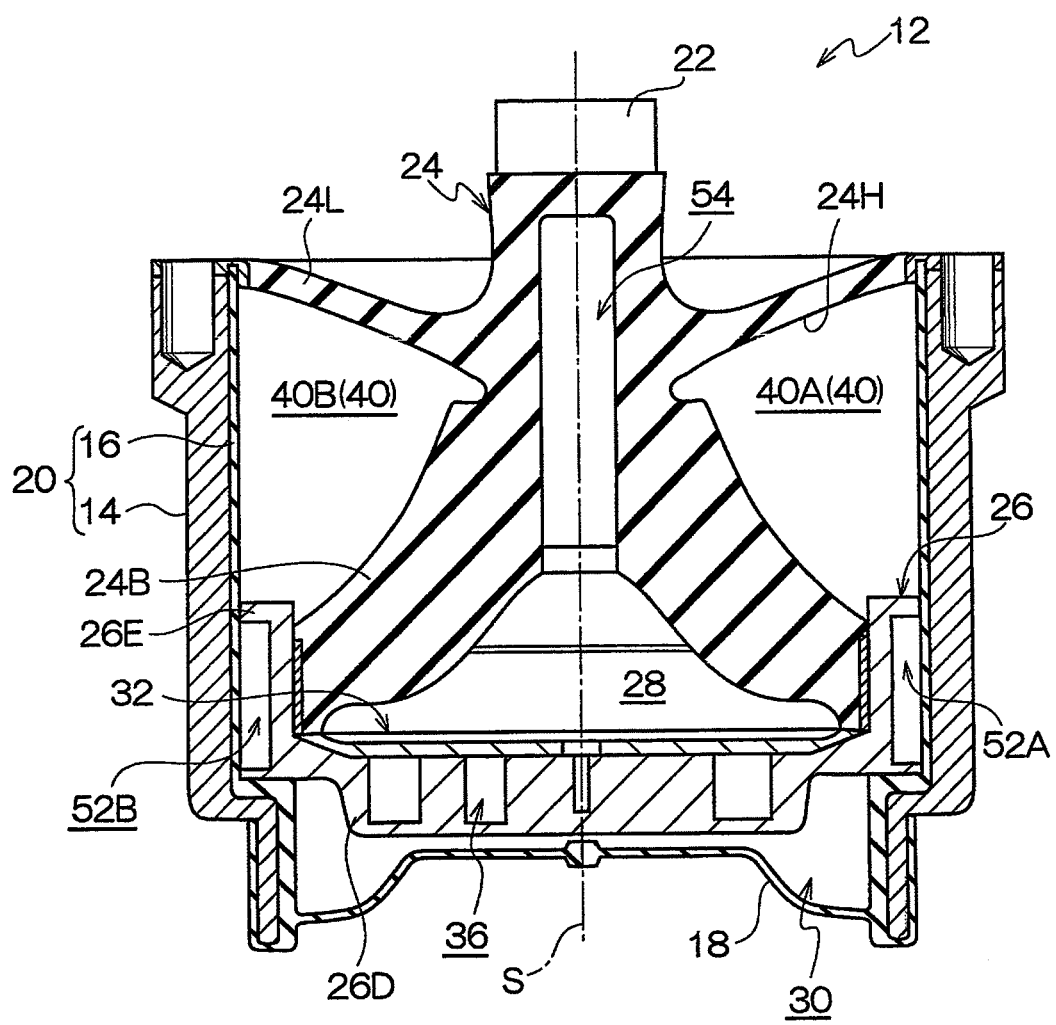
FIG. 3 is a cross-section illustrating a configuration of a vibration isolation device according to the first exemplary embodiment of the present invention, taken on line III-III of FIG. 2.
Figure 4:
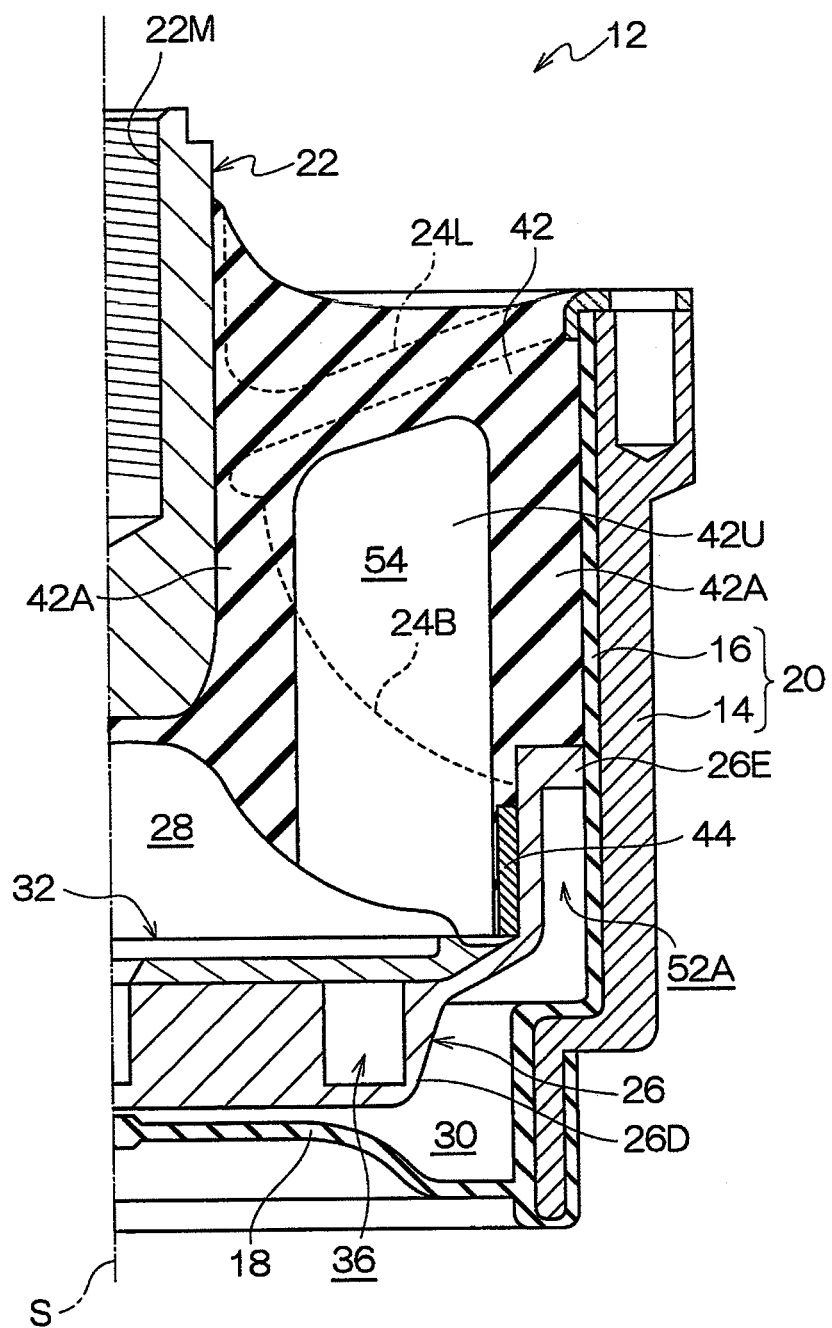
FIG. 4 is an axial direction cross-section of a configuration of a vibration isolation device according to the first exemplary embodiment of the present invention, taken at a different position to FIG. 3.

As shown in detail in FIG. 3 and FIG. 4, the vibration isolation device 12 includes an outer cylinder 14 formed with a substantially circular cylindrical shape. A reduced diameter section 14S is formed through a stepped section 14D at a position below the axial direction center of the outer cylinder 14. A covering rubber 16 is vulcanize bonded to and covers substantially all of the inner peripheral face of the outer cylinder 14. A diaphragm 18 extends out integrally from the vicinity of the bottom end of the covering rubber 16 towards the radial direction inside.

The diaphragm 18 is a membrane shaped member curving such that the central portion of the diaphragm 18 protrudes upwards, and an auxiliary liquid chamber 30 is configured between the diaphragm 18 and a circular cylindrical orifice body 26, described later. The auxiliary liquid chamber 30 expands and contracts by the diaphragm 18 deforming such that the volume of the auxiliary liquid chamber 30 changes. The outer cylinder 14 and the covering rubber 16 together configure a first attachment member 20 according to the present invention.

Plural (for example 3) leg portions extend out from the outer cylinder 14 towards the radial direction outside, and the vibration isolation device 12 is mounted to a vehicle body by passing bolts through bolt holes that pass through the leading ends of the leg portions. Configuration may be made such that in place of (or as well as) the leg portions a structure is employed with a bracket fixed to the outer cylinder 14, and the bracket is then employed for attaching the outer cylinder 14 to the vehicle body.

A circular cylindrical shaped internal cylinder 22 is disposed inside the outer cylinder 14 so as to be positioned on the axial center S. The lower bottom portion of the internal cylinder 22 is closed but the upper end portion of the internal cylinder 22 is open with a female thread 22M formed to the inner periphery. An engine is supported by the vibration isolation device 12 by, for example, screwing a bolt on the engine side into the female thread 22M. The vibration isolation device 12 of the present exemplary embodiment exhibits a vibration attenuation effect in the axis-orthogonal direction, however the axial center of the internal cylinder 22 is aligned with the axial center of the outer cylinder 14 in a state in which there is no vibration input.

A rubber resilient body 24 is disposed between the internal cylinder 22 and the outer cylinder 14 (the covering rubber 16), and the internal cylinder 22 and the outer cylinder 14 are coupled together by the rubber resilient body 24. The circular cylindrical orifice body 26 and a partitioning circular plate 32 are disposed between the rubber resilient body 24 and the diaphragm 18 or the covering rubber 16.

The rubber resilient body 24 includes a rubber body portion 24B of truncated circular conical shape with a diameter that gradually widens as the rubber body portion 24B extends out from a lower side portion of the internal cylinder 22 towards the circular cylindrical orifice body 26. A lid portion 24L is also provided above the rubber body portion 24B, with a diameter that gradually widens as the lid portion 24L extends out towards the top end of the outer cylinder 14 (namely towards the opposite side to that of the partitioning circular plate 32 as viewed from the rubber body portion 24B). A recessed portion 24H is provided between the rubber body portion 24B and the lid portion 24L, and a liquid chamber 40 according to the present invention is provided between the recessed portion 24H and the first attachment member 20 (the covering rubber 16). The volume can be increased by forming the rubber body portion 24B in such a shape, enabling a high vibration damping effect to be exhibited during elastic deformation and durability to be raised.

The circular cylindrical orifice body 26 includes a substantially circular plate shaped orifice circular plate portion 26D and a substantially circular cylinder shaped orifice cylinder portion 26E that extends up from the outer periphery of the orifice circular plate portion 26D. The external edge portion of the bottom face of the orifice cylinder portion 26E is supported on the covering rubber 16 at the stepped section 14D. The partitioning circular plate 32 is supported on the orifice circular plate portion 26D, and a first main liquid chamber 28 is configured between the partitioning circular plate 32 and the rubber body portion 24B of the rubber resilient body 24. The first main liquid chamber 28 is filled with a liquid, such as ethylene glycol or a silicone oil. The auxiliary liquid chamber 30 is configured between the orifice circular plate portion 26D and the diaphragm 18. The auxiliary liquid chamber 30 is also, similarly to the first main liquid chamber 28, filled with a liquid, such as ethylene glycol or a silicone oil. In particular, since a portion of the auxiliary liquid chamber 30 is configured by the diaphragm 18, it is possible to achieve a state in which the auxiliary liquid chamber 30 is at close to atmospheric pressure due to deformation of the diaphragm 18 (by causing liquid to flow in or out).

A spiral shaped first orifice 36 is formed in the orifice circular plate portion 26D. The top end of the first orifice 36 is in communication with the first main liquid chamber 28 through a communication hole 38 formed in the partitioning circular plate 32. The bottom end of the first orifice 36 is open downwards and in communication with the auxiliary liquid chamber 30. The first orifice 36 configures a flow path permitting liquid to move between the first main liquid chamber 28 and the auxiliary liquid chamber 30. In particular, the length and the cross-sectional area of the first orifice 36 are set as a flow path according to vibrations of a characteristic frequency range (for example shake vibration), and adjusted such that vibration energy can be absorbed by liquid movement between the first main liquid chamber 28 and the auxiliary liquid chamber 30.

As stated above, in the present exemplary embodiment, a structure is configured such that there are relative changes in the pressure of the first main liquid chamber 28 and the auxiliary liquid chamber 30, however when vibration occurs at about a frequency that cannot be absorbed by liquid movement through the first orifice 36 such a pressure fluctuation is alleviated by deformation of thin wall portions 42U, and a conventional membrane is not provided. The partitioning circular plate 32 and the orifice circular plate portion 26D are of a degree of rigidity such as not to deform unintentionally even when the pressure of the first main liquid chamber 28 changes. Accordingly, since the first main liquid chamber 28 and a second main chamber are partitioned by a high rigidity member without employing a conventional membrane, a drop in the pressure of the first main liquid chamber 28 caused by deformation of such a membrane is suppressed.

Figure 2:
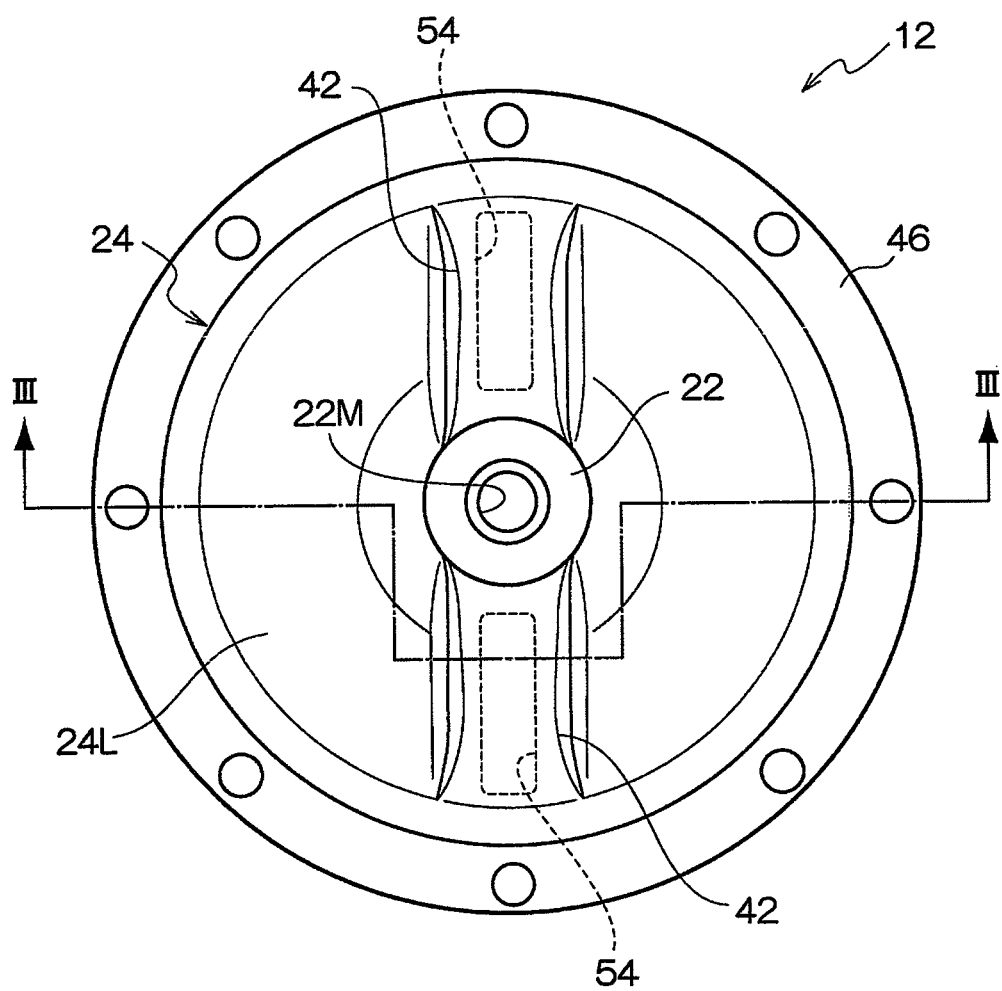
FIG. 2 is a plan view illustrating a configuration of a vibration isolation device according to the first exemplary embodiment of the present invention.
Figure 5:
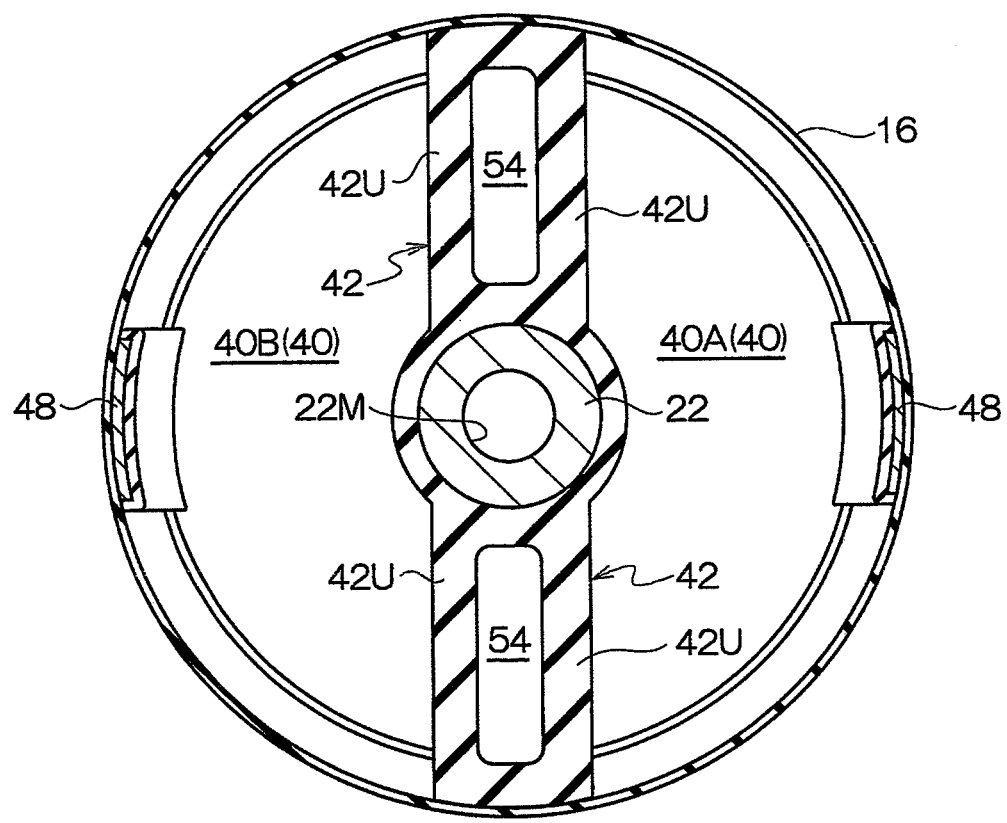
FIG. 5 is horizontal cross-section illustrating a configuration of a vibration isolation device according to the first exemplary embodiment of the present invention.

As shown in FIG. 2, FIG. 4 and FIG. 5, two separation walls 42 are formed between the rubber body portion 24B and the lid portion 24L so as to section the liquid chamber 40 in the axis-orthogonal direction. The separation walls 42 are formed symmetrically about the axial center S, and are continuous from the lid portion 24L to the rubber body portion 24B. The leading ends of the separation walls 42 (the end portion on the side the furthest away from the axial center S) are in press contact with the inside of the first attachment member 20 (the covering rubber 16), as shown in FIG. 4 and FIG. 5, thereby sectioning the liquid chamber 40 into two second main liquid chambers 40A, 40B with the separation walls 42. As shown in FIG. 4, the separation walls 42 extend upwards further than the lid portion 24L.

As shown in FIG. 1, a flat circular cylindrical shaped retaining cylinder 44 is disposed at and vulcanize bonded to the outer peripheral face of the rubber body portion 24B of the rubber resilient body 24. The retaining cylinder 44 presses against the inner peripheral face of the orifice cylinder portion 26E of the circular cylindrical orifice body 26, and the rubber resilient body 24 is accordingly suppressed from unintentional displacement with respect to the circular cylindrical orifice body 26. A ring shaped retaining ring 46 is disposed at and vulcanize bonded to the outer peripheral face of the lid portion 24L of the rubber resilient body 24. The bottom face of the retaining ring 46 is in close press contact with the top face of the outer cylinder 14, and the lid portion 24L of the rubber resilient body 24 is accordingly fixed with respect to the outer cylinder 14 by the retaining ring 46 being fixed to the outer cylinder 14. As shown in FIG. 5, the retaining cylinder 44 and the retaining ring 46 are coupled and integrated together by plural support plates 48 formed between the retaining cylinder 44 and the retaining ring 46. The retaining cylinder 44, the retaining ring 46, and the support plates 48 are integrally formed from for example metal. The rubber resilient body 24 is also vulcanize bonded and integrated to the inside of the retaining cylinder 44 and the retaining ring 46. The thus configured integrated member is press fitted inside the first attachment member 20 (the covering rubber 16).

Figure 7:
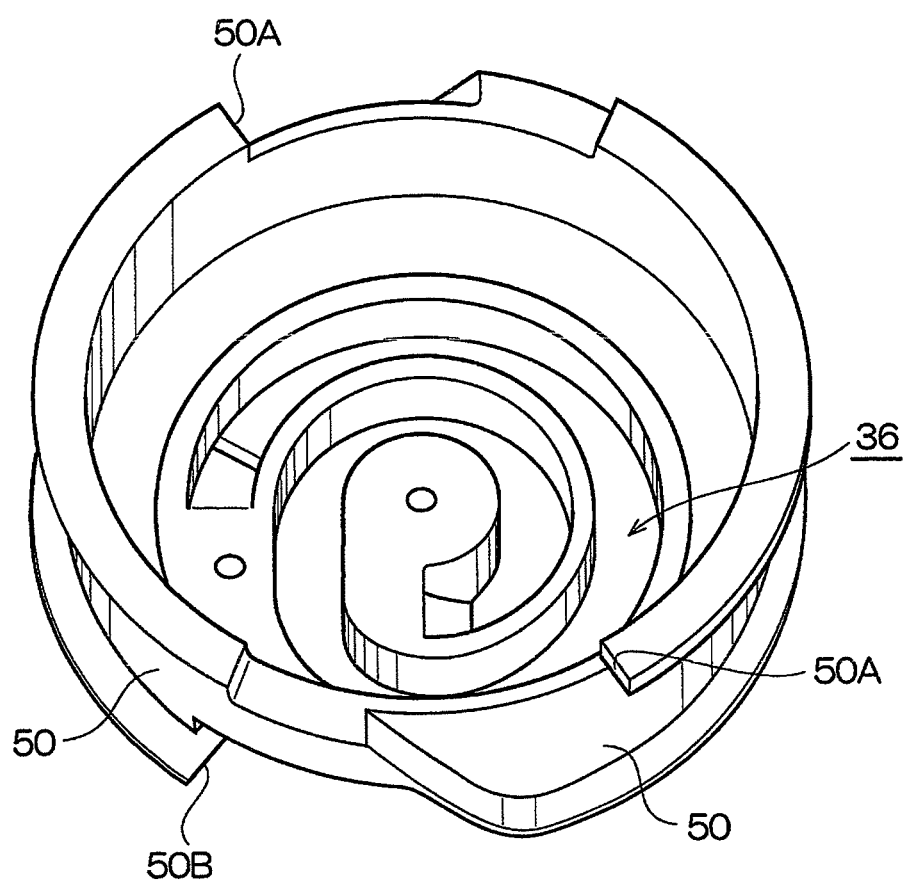
FIG. 7 is a perspective view illustrating a circular cylindrical orifice body configuring a vibration isolation device according to the first exemplary embodiment of the present invention.

Two recessed grooves 50 are formed in the outer peripheral face of a circular cylinder orifice section 26E of the circular cylindrical orifice body 26. As shown in detail in FIG. 7, one end (a portion at the top end) of each of the recessed grooves 50 is in communication with the second main liquid chambers 40A, 40B through a communication portion 50A, and the other end (a portion at the bottom end) of each of the recessed grooves 50 is in communication with the auxiliary liquid chamber 30 through a communication portion 50B. In the recessed grooves 50 the two second orifices 52A, 52B are configured at portions formed between the circular cylinder orifice section 26E and the first attachment member 20 (the covering rubber 16) so as to correspond to the respective second main liquid chambers 40A, 40B. Each of the second orifices 52A, 52B configures a flow path permitting liquid to move between the corresponding second main liquid chamber 40A, 40B and the auxiliary liquid chamber 30. The length and cross-sectional area of the second orifices 52A, 52B are set according to vibrations of a characteristic frequency range, and are adjusted to enable vibration energy to be absorbed by liquid moving between the second main liquid chambers 40A, 40B and the auxiliary liquid chamber 30. In particular the set frequency in the second orifices 52A, 52B is higher than the set frequency in the first orifice 36.

The circular cylindrical orifice body 26 of the present exemplary embodiment is formed with the first orifice 36 on the inner peripheral side and the second orifices 52A, 52B formed on the outer peripheral side. Since two orifices are formed separately along the circumferential direction at the inside and outside, the degrees of freedom for designing the mutual shapes of the orifices are increased, and it is possible for example to secure sufficient length as liquid flow path.

Figure 6:
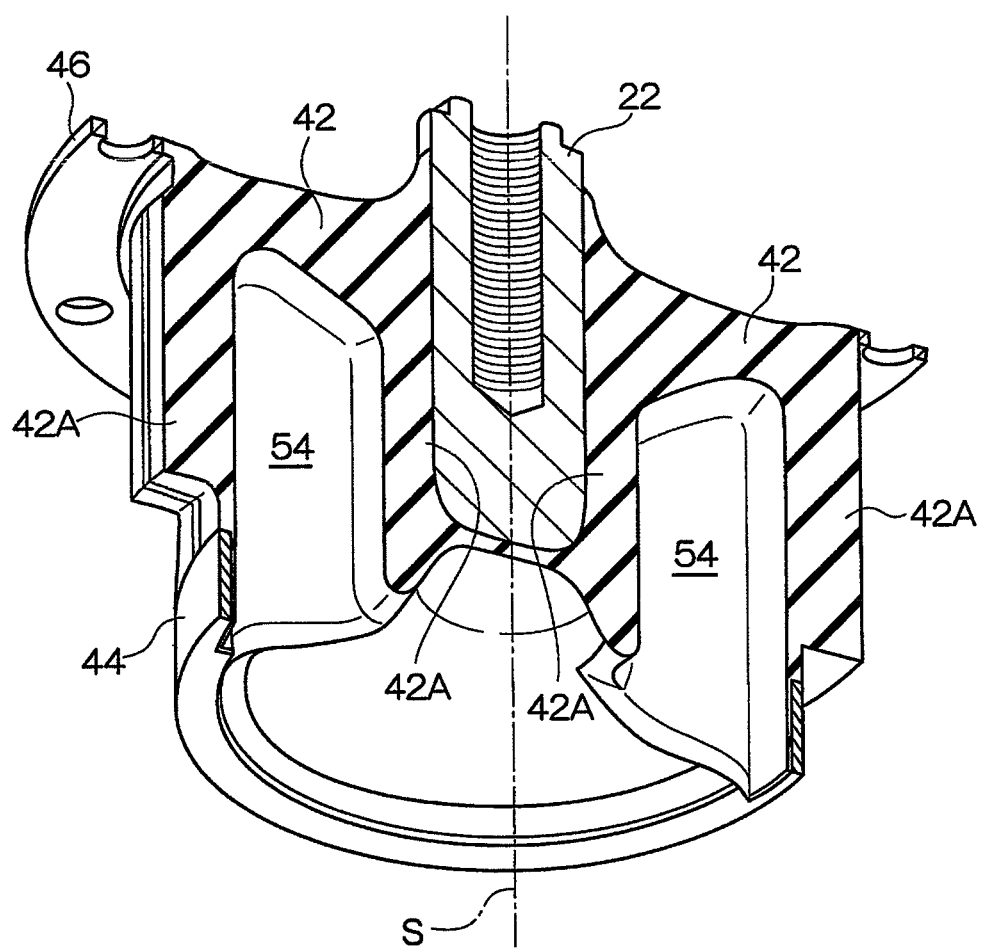
FIG. 6 is a perspective view illustrating an internal configuration of a vibration isolation device according to the first exemplary embodiment of the present invention, partially cut-away along the axial direction.

As shown in detail in FIG. 4 and FIG. 6, a thinned thickness portion 54 is formed at a central portion in the thickness direction of each of the separation walls 42. Namely, rubber configuring the rubber resilient body 24 is not present at thickness direction central portions in the portions for the separation walls 42. The thinned thickness portions 54 accordingly configure recessed portions that are open downwards, namely towards the first main liquid chamber 28 side, as viewed from the first main liquid chamber 28. In contrast, the thinned thickness portions 54 are not open upwards, and are closed with rubber. As shown in FIG. 4, the thinned thickness portions 54 are formed in substantially rectangular shapes when the separation walls 42 are viewed face-on.

By thus forming the thinned thickness portions 54 in the separation walls 42, a thin walled portion 42U is formed at both sides of the thinned thickness portion 54 (both thickness direction sides of the separation walls 42, see FIG. 5). A pressure difference reduction means is configured in the separation wall 42 by thin walled portions 42U on both sides of a hollowed-out space formed by thinning from a thickness direction central portion of the separation wall 42 out towards the first main liquid chamber 28. At the portion where the thinned thickness portions 54 are formed, the first main liquid chamber 28 and the second main liquid chambers 40A, 40B are separated by the thin wall portions 42U. The portions of the separation walls 42 other than at the thin wall portions 42U configure thick walled portions 42A that are relatively thick. The thick walled portions 42A are formed at the radial direction inside and the outside of the separation walls 42 so as to be continuous from the top end (the lid portion 24L) to the bottom end (the rubber body portion 24B).

The thickness of the thin wall portions 42U is determined such that when a high frequency of fluctuations in relative pressure between the first main liquid chamber 28 and the second main liquid chamber 40A and the second main liquid chamber 40B of a specific value or greater occurs (for example at about a frequency that causes the first orifice 36 to block), the pressure fluctuation can be alleviated by the thin wall portions 42U deforming. However, the thickness of the thick walled portions 42A is determined such that the separation walls 42: reliably press against the covering rubber 16, making a liquid tight seal between the separation walls 42 and the covering rubber 16; reliably support the lid portion 24L; exhibit a resisting force by resilient deformation to counter relative movement when relative movement occurs between the internal cylinder 22 and the outer cylinder 14; and enable efficient dissipation of energy of relative movement due to internal friction.

Explanation follows regarding operation of the vibration isolation device 12 according to the present exemplary embodiment.

When an engine is switched on, vibration from the engine is transmitted to the rubber resilient body 24 through the internal cylinder 22. When this occurs the rubber resilient body 24 acts as a vibration absorbing body and absorbs input vibration by an attenuating action, due for example to internal friction accompanying deformation of the rubber resilient body 24.

An example follows in which the main vibrations input to the vibration isolation device 12 from the engine are vibration (primary vibration) generated within the engine due to pistons performing reciprocating movement in the engine, and vibration (secondary vibration) occurring due to changes in the rotation speed of the crankshaft in the engine. There is also vibration input to the vibration isolation device 12 from the vehicle side in the vicinity of the primary vibration and secondary vibration. The rubber resilient body 24 is capable of absorbing vibration through attenuating action, by for example internal friction, both when the input vibration is the primary vibration and the secondary vibration. In practice a vibration that is a combination of the primary vibration and the secondary vibration acts on the vibration isolation device 12, however for simplicity explanation follows of the vibration isolation device 12 separately for each of these vibrations. As an example of the disposed orientation of the vibration isolation device 12, the primary amplitude direction is taken as being aligned with the axial direction of the vibration isolation device 12, and the secondary amplitude direction is taken as being aligned with the axis-orthogonal direction of the vibration isolation device 12.

Figure 8:
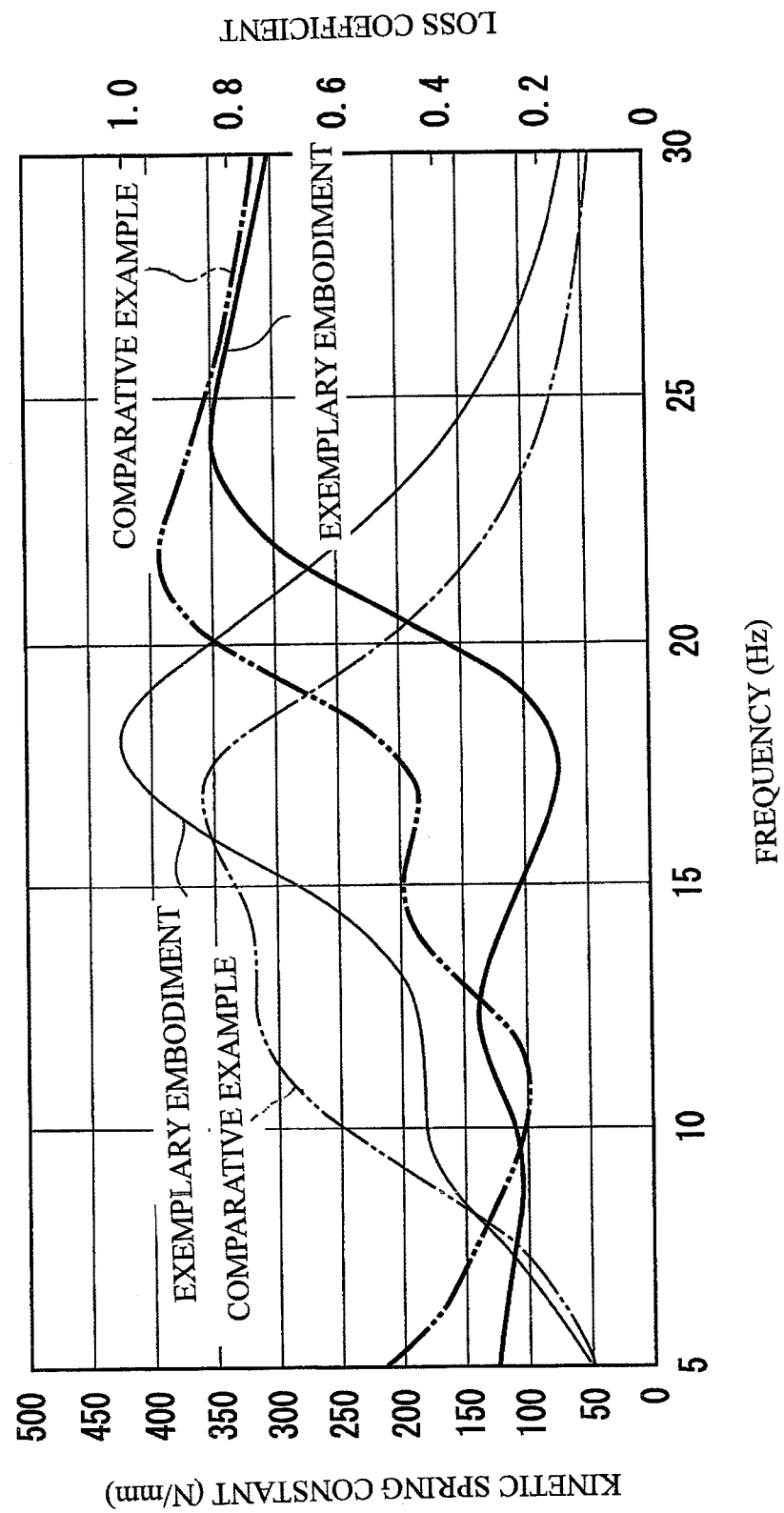
FIG. 8 is a graph illustrating relationships of kinetic spring constants at amplitudes of ±0.3 mm and loss coefficients at amplitudes of ±1.0 mm against frequency of input acting on the vibration isolation device in the axial direction.

Explanation follows first regarding when the primary vibration is input to the vibration isolation device 12, with reference to the graph in FIG. 8. This graph illustrates an example of the relationship between the kinetic spring constant and the loss coefficient of the rubber resilient body 24 in response to frequencies of input vibration acting along the axial direction. In the graph the bold lines illustrate kinetic spring constants and the thin lines illustrate the loss coefficients. The solid lines respectively show the vibration isolation device 12 of the present exemplary embodiment and the double-dot intermittent lines respectively show a vibration isolation device of a comparative example. The vibration isolation device of the comparative example has a similar structure to that of the vibration isolation device 12 of the present exemplary embodiment except in that there are no portions formed in the separation walls 42 to correspond to the thin wall portions 42U of the present exemplary embodiment.

In the vibration isolation device 12 of the present exemplary embodiment, the first main liquid chamber 28 is in communication with the auxiliary liquid chamber 30 through the first orifice 36. Accordingly, when the primary vibration is input to the internal cylinder 22 from the engine side, the rubber resilient body 24 resiliently deforms along the primary amplitude direction, and the internal volume of the first main liquid chamber 28 expands and contracts. Liquid accordingly flows through the first orifice 36 between the first main liquid chamber 28 and the auxiliary liquid chamber 30 in synchronization with the input vibration.

The path length and the cross-sectional area of the first orifice 36 are set according to the frequency of a characteristic input vibration (for example a shake vibration). A resonance phenomenon (liquid column resonance) therefore occurs in the liquid flowing to-and-fro between the first main liquid chamber 28 and the auxiliary liquid chamber 30 through the first orifice 36. Particularly efficient absorption can accordingly be achieved of input vibration in the primary amplitude direction due to pressure fluctuations and viscous resistance of the liquid accompanying liquid column resonance.

In particular the first main liquid chamber 28 and the second main liquid chambers 40A, 40B are separated by the thin wall portions 42U in the present exemplary embodiment. Therefore, when the input vibration frequency in the primary amplitude direction is high the thin wall portions 42U deform according to the pressure fluctuations in the first main liquid chamber 28 when the first orifice 36 has entered a blocked state and liquid flow is impeded. Due to the second main liquid chambers 40A, 40B being in communication with the second orifices 52A, 52B through the auxiliary liquid chamber 30 in the present exemplary embodiment, liquid column resonance also occurs due to the second orifices 52A, 52B between the second main liquid chambers 40A, 40B and the auxiliary liquid chamber 30. The kinetic spring constant can accordingly be suppressed from rising along with rising liquid pressure in the first main liquid chamber 28. This point can be seen by comparing the bold solid line (the present exemplary embodiment) with the bold double-dot intermittent line (the comparative example) in the graph illustrated in FIG. 8. Namely, in the relatively high frequency region (about 13 Hz or greater), the present exemplary embodiment has a lower kinetic spring constant than that of the comparative example. In addition, in the present exemplary embodiment, the loss coefficient in the region of frequencies of about 16 Hz or greater is higher than that of the comparative example. In the present exemplary embodiment, even when such high frequency vibrations are input in the primary amplitude direction, the rubber resilient body 24 maintains a low kinetic spring constant by performing "pressure release" and the rubber resilient body 24 performs resilient deformation so as to also enable efficient absorption of high frequency vibrations.

As explained above, configuration is made with a structure in which the second main liquid chambers 40A, 40B are in communication through the second orifices 52A, 52B with the auxiliary liquid chamber 30. This enables a peak loss coefficient to be caused to occur in two locations, a relatively low frequency region and a relatively high frequency region, by for example appropriately setting the flow path cross-sectional area and flow path length for the first orifice 36 and each of the second orifices 52A, 52B. For example, there is a first peak on the thin solid line in the graph of FIG. 8 (the present exemplary embodiment) at a low frequency region (about 10 Hz), and a second peak at a high frequency region (about 18 Hz). In the thin double-dot intermittent line (comparative example) there is also a first peak in a low frequency region (about 12 Hz) and a second peak in a high frequency region (about 17 Hz). By comparing the thin solid line (the present exemplary embodiment) and the thin double-dot intermittent line (the comparative example) it can be seen that the frequency of the loss coefficient of the first peak is lower in the present exemplary embodiment than in the comparative example.

Figure 9:
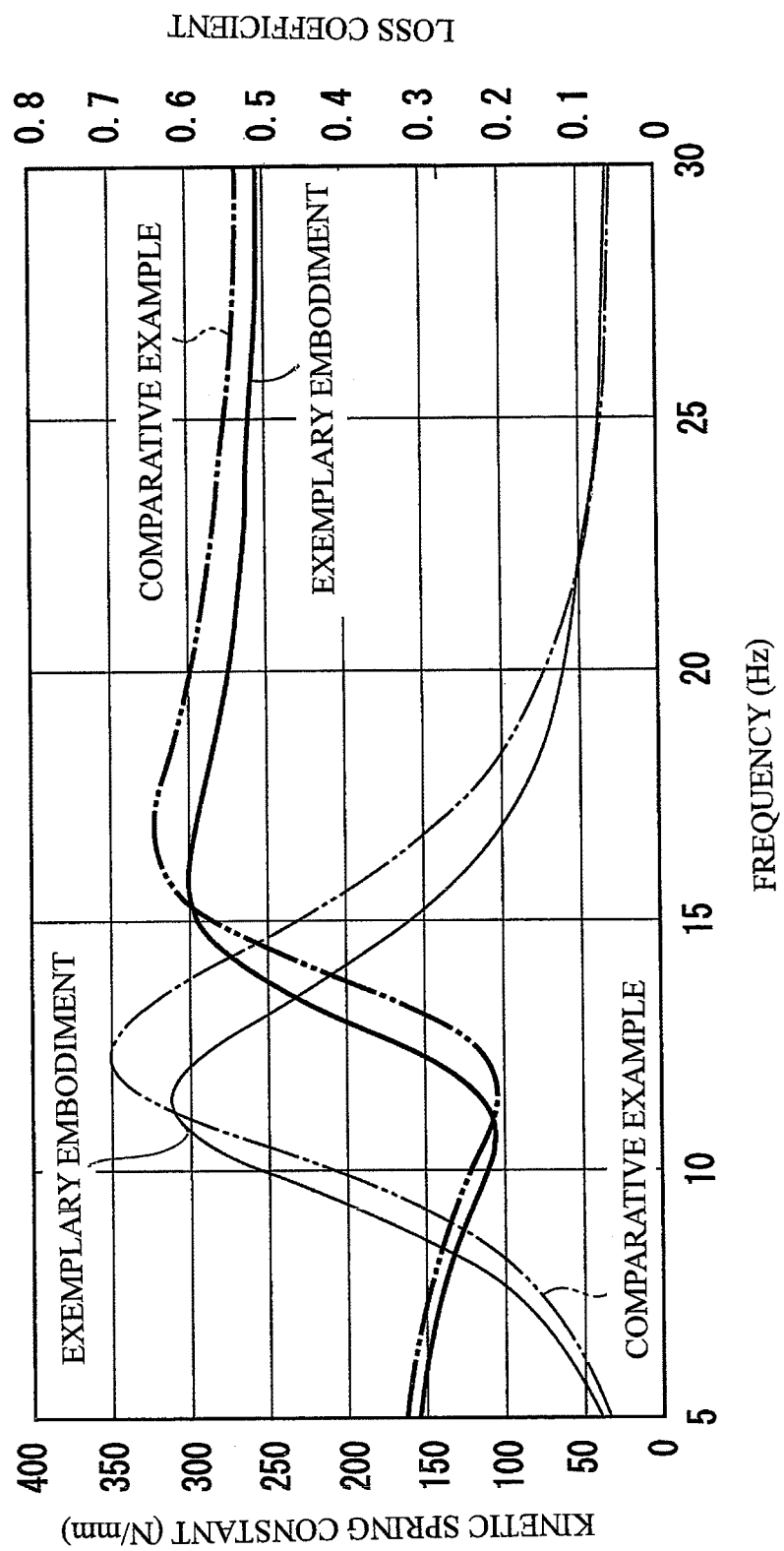
FIG. 9 is a graph illustrating relationships of kinetic spring constants at amplitudes of ±0.3 mm and loss coefficients at amplitudes of ±1.0 mm against frequency of input acting on the vibration isolation device in an axis-orthogonal direction.

Explanation follows regarding input of secondary vibration to the vibration isolation device 12, with reference to the graph illustrated in FIG. 9. In this graph examples are shown of the relationship between the kinetic spring constant and the loss coefficient of the rubber resilient body 24 against frequency of input vibration acting in the axis-orthogonal direction. Similarly to in FIG. 8, in this graph the bold lines show the kinetic spring constant and the thin lines show the loss coefficient. The solid lines show the vibration isolation device 12 of the present exemplary embodiment and the double-dot intermittent line show the vibration isolation device of a comparative example.

In the vibration isolation device 12 of the present exemplary embodiment, the second main liquid chambers 40A, 40B are in communication with the auxiliary liquid chamber 30 through the second orifices 52A, 52B. Consequently, the internal volumes of the second main liquid chambers 40A, 40B are caused to expand and contract along with the resilient deformation of the rubber resilient body 24 in the secondary amplitude direction. The liquid accordingly flows to-and-fro between the second main liquid chambers 40A, 40B and the auxiliary liquid chamber 30 through the second orifices 52A, 52B in synchronization with the input vibration.

The path length and the cross-sectional area of the second orifices 52A, 52B are set according to the frequency of a characteristic input vibration. A resonance phenomenon (liquid column resonance) accordingly occurs in the liquid flowing to-and-fro between the second main liquid chambers 40A, 40B and the auxiliary liquid chamber 30 through the second orifices 52A, 52B. The input vibration in the secondary amplitude direction can accordingly be particularly efficiently absorbed by pressure fluctuations and viscous resistance accompanying the liquid column resonance.

In particular in the present exemplary embodiment, the first main liquid chamber 28 and the second main liquid chambers 40A, 40B are separated by the thin wall portions 42U. The thin wall portions 42U of the separation walls 42 accordingly vibrate in synchronization with the input vibration when the frequency of the input vibration in the secondary amplitude direction is high. The kinetic spring constant can thereby be suppressed from rising along with changes in liquid pressure in the second main liquid chambers 40A, 40B. Namely, it can be seen by comparing the bold solid line (present exemplary embodiment) and the bold double-dot intermittent line (the comparative example) in the graph shown in FIG. 9 that in the region of frequencies of about 15 Hz and higher the kinetic spring constant is lower in the present exemplary embodiment than in the comparative example. Namely, in the present exemplary embodiment, even when such high frequency vibrations are input in the secondary amplitude direction, the rubber resilient body 24 maintains a low kinetic spring constant by performing "pressure release" and the rubber resilient body 24 performs resilient deformation so as to also enable efficient absorption of high frequency vibrations.

It can be seen by comparing the thin solid line (present exemplary embodiment) and the thin double-dot intermittent line (the comparative example) in the graph of FIG. 9 that the frequency when the loss coefficient peaks is lower in the present exemplary embodiment than in the comparative example.

As explained above, in the present exemplary embodiment, for both the primary vibration direction (the axial direction) and the secondary vibration direction (the axis-orthogonal direction) the rubber resilient body 24 maintains a low kinetic spring constant by performing "pressure release" and the rubber resilient body 24 performs resilient deformation so as to also enable efficient absorption of high frequency vibrations.

The vibration isolation device 12 of the first exemplary embodiment is configured by forming the thin wall portions 42U of the separation walls 42 as the pressure difference reduction means of the present invention. However, since the shape of the rubber body portion 24B and other portions do not change, there is little impact on the performance of the vibration isolation device 12 overall, and so the vibration isolation device 12 can still maintain the high vibration damping performance originally demanded.

In the vibration isolation device 12 of the present exemplary embodiment, as can be seen from FIG. 1 to FIG. 4, since pressure fluctuations at high frequency in the first main liquid chamber 28 and the auxiliary liquid chamber 30 can be alleviated by the thin wall portions 42U, there is no need to provide a conventional member such as a membrane in the circular cylindrical orifice body 26. The first orifice 36 can accordingly be formed at the position where a conventional membrane would have been disposed, and the degrees of freedom for setting the shape of the first orifice 36 (the flow path cross-sectional area and flow path length) are increased. However, the number of components is not increased since no membrane is provided. The structure is accordingly simplified since there is no requirement for a structure for disposing the membrane to be formed in the circular cylindrical orifice body 26, and manufacturing can be achieved at lower cost.

Figure 10:
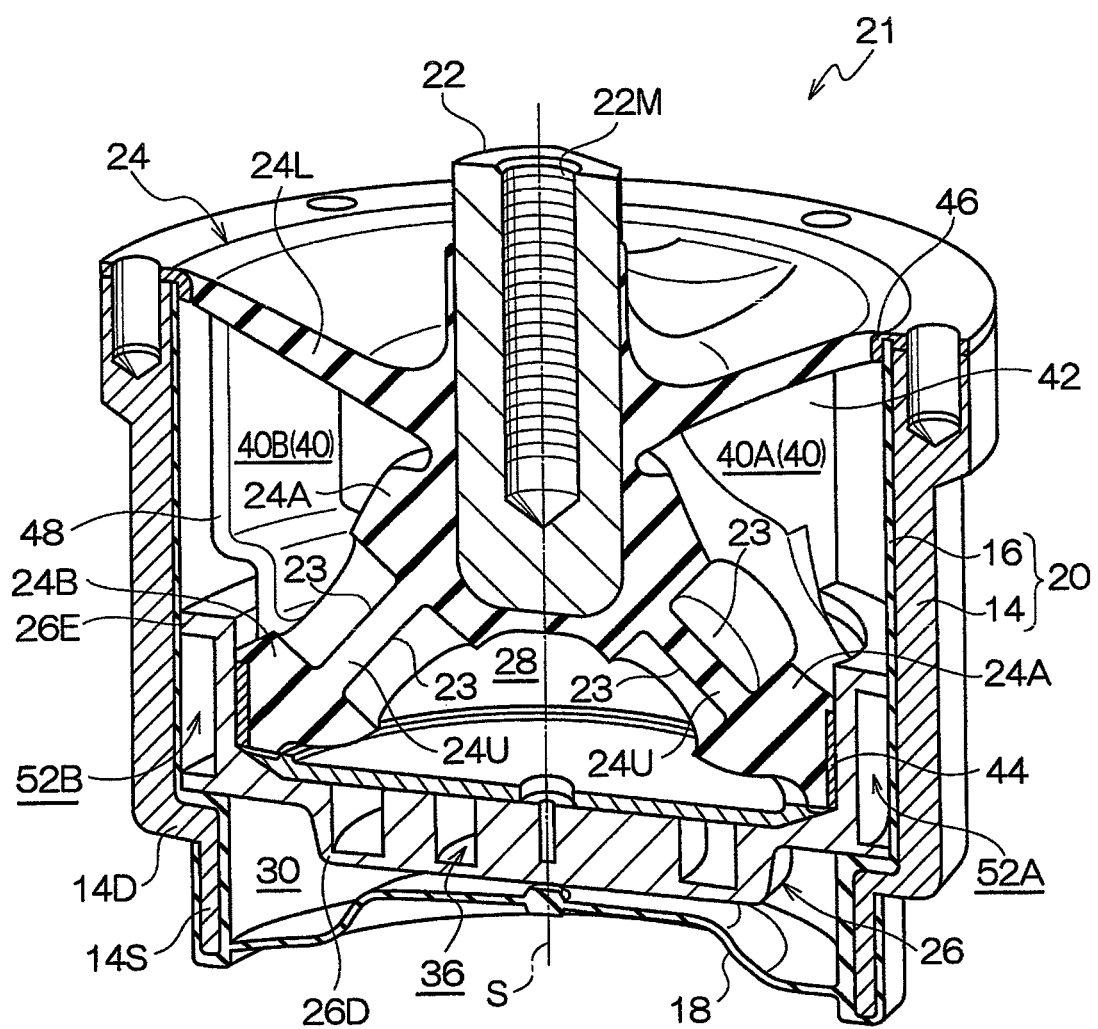
FIG. 10 is a perspective view illustrating a configuration of a vibration isolation device according to a second exemplary embodiment of the present invention, partially cut-away along the axial direction.

FIG. 10 illustrates a vibration isolation device 21 of a second exemplary embodiment of the present invention. Similar configuration elements and members in the second exemplary embodiment to those of the first exemplary embodiment are allocated the same reference numerals, and further detailed explanation thereof is omitted.

Second Exemplary Embodiment

In the second exemplary embodiment, there are no thin wall portions 42U formed to separation walls 42, and instead in a rubber body portion 24B circular shaped recess portions 23 are formed as local indentations in both surfaces (the top face and the bottom face) of the rubber body portion 24B. Namely, there are thinned portions 24U of local thinning formed in the rubber body portion 24B due to the recess portions 23, and portions of the rubber body portion 24B other than at the thinned portions 24U configure thick portions 24A that are relatively thick. In particular the thick portions 24A are shaped so as to be continuous from the radial direction inside of the rubber body portion 24B (the side in the vicinity of the internal cylinder 22) to the radial direction outside (the side in the vicinity of the covering rubber 16).

The thickness of the thinned portions 24U is determined such that pressure fluctuations can be alleviated by deformation of the thinned portions 24U when relative fluctuations occur between the pressures of the first main liquid chamber 28 and the second main liquid chambers 40A, 40B at a high frequency of a specific value or greater. However the thickness of the thick portions 24A is determined such when relative movement occurs between the internal cylinder 22 and the outer cylinder 14, resistant force acting against the relative movement is generated by resilient deformation of the thick portions 24A, and the energy of the relative movement can be efficiently dissipated by internal friction such that the original performance as a vibration isolation device 21 can be achieved.

In the vibration isolation device 21 of the second exemplary embodiment, the kinetic spring constant can be lowered for high frequencies of input vibration in the both directions of the axial direction and the axis-orthogonal direction. However, the thickness of the rubber resilient body 24 of the rubber body portion 24B is determined such that when relative movement between the internal cylinder 22 and the outer cylinder 14 occurs, efficient dissipation of energy from the relative movement is achieved by internal friction due to resilient deformation, and original performance as the vibration isolation device 21 can be achieved. Namely, the thinned portions 24U have little impact on the performance of the vibration isolation device 21 overall, and the vibration isolation device 21 can maintain the originally demanded high vibration damping performance.

Figure 11:
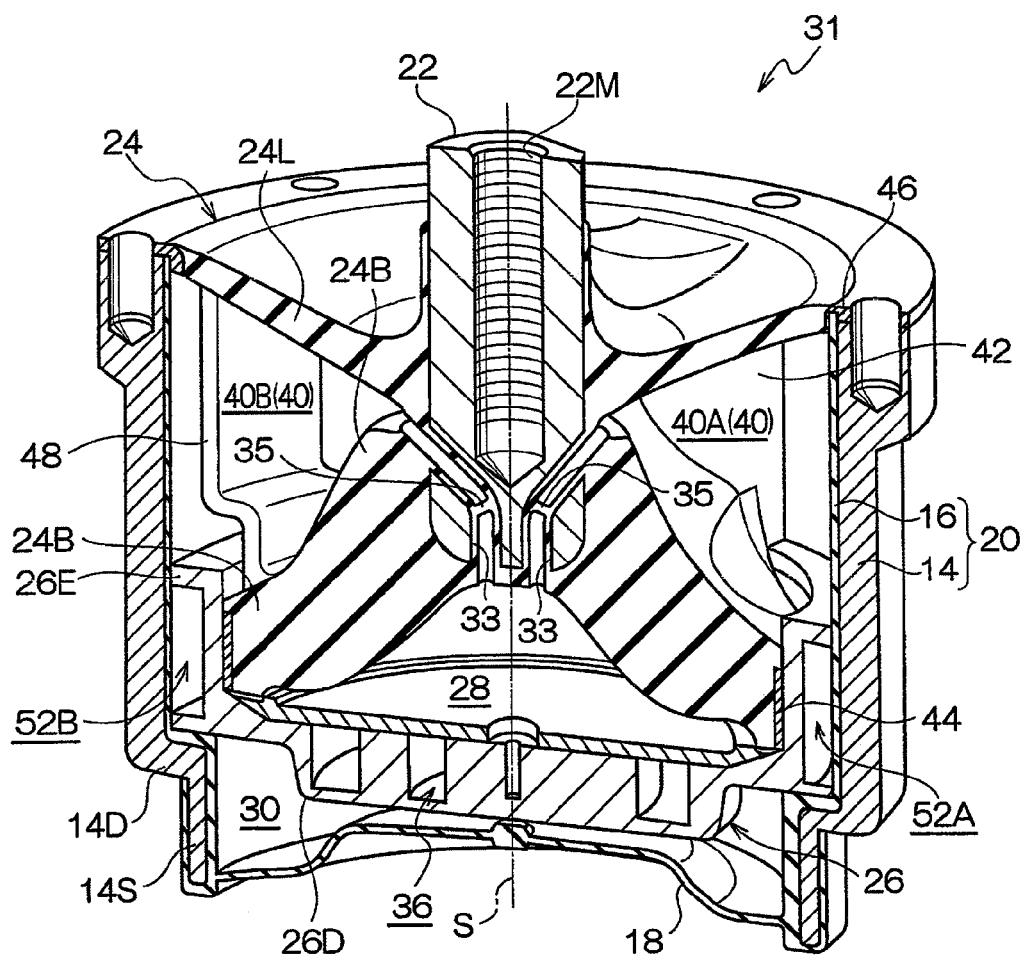
FIG. 11 is a perspective view illustrating a configuration of a vibration isolation device according to a third exemplary embodiment of the present invention, partially cut-away along the axial direction.

FIG. 11 illustrates a vibration isolation device 31 of a third exemplary embodiment of the present invention. Similar configuration elements and members in the third exemplary embodiment to those of the first exemplary embodiment are allocated the same reference numerals, and further detailed explanation thereof is omitted.

Third Exemplary Embodiment

In the third exemplary embodiment, there are no thin wall portions 42U formed to walls 42, and there are no thinned portions 24U formed to the rubber body portion 24B. However in their place through holes 33 are formed in an internal cylinder 22, and thin membrane portions 35 are also formed inside the through holes 33.

The through holes 33 are formed so as to communication between the first main liquid chamber 28 and the respective second main liquid chamber 40A, 40B. The thin membrane portions 35 are formed extending across inside the through holes 33 as rubber configuring the rubber resilient body 24, at substantially length direction central portions in the through holes 33 from the first main liquid chamber 28 side and from the second main liquid chambers 40A, 40B side. The insides of the through holes 33 are accordingly separated into portions on the first main liquid chamber 28 side and portions on the second main liquid chambers 40A, 40B side by the thin membrane portions 35. The thickness of the thin membrane portions 35 is determined such that the thin membrane portions 35 deform when relative pressure fluctuations between the first main liquid chamber 28 and the second main liquid chambers 40A, 40B occur at a high frequency of a specific value or greater, thereby enabling such pressure fluctuations to be alleviated.

Accordingly, in a vibration isolation device 31 of the third exemplary embodiment too, the kinetic spring constant can be lowered for high frequency input vibrations in both directions of the axial direction and the axis-orthogonal direction. However, since there is no accompanying change to the shape of the rubber body portion 24B, there is little impact on the performance of the vibration isolation device 31 overall, and the vibration isolation device 31 can maintain the originally demanded high vibration damping performance.

Obviously there is no limitation of the pressure difference reduction means of the present invention to the thin wall portions 42U, the thinned portions 24U or the thin membrane portions 35 that have been described above. Namely, any configuration may be adopted that enables "pressure release" between the first main liquid chamber 28 and the second main liquid chambers 40A, 40B.

Furthermore, while an example has been given above in which the thin wall portions 42U are formed to both faces of two separation walls 42, forming the thin wall portions 42U is not limited to these locations and numbers. For example, thin wall portions 42U may be formed to only one of the separation walls 42.

In the above an example has been given as the vibration isolation device 12 of a structure in which the second main liquid chambers 40A, 40B are in communication with the auxiliary liquid chamber 30 through second restricting through paths (the second orifices 52A, 52B), however another structure may be employed. For example, in place of the second orifices 52A, 52B described above, a configuration may be made in which there is a direct connection through path for directly connecting the second main liquid chambers 40A, 40B together as the second restricting through path. Such a direct connection through path and the second orifices 52A, 52B of the exemplary embodiment of the present invention may be used together. In particular, when the second main liquid chambers 40A, 40B are placed in communication with the auxiliary liquid chamber 30, liquid movement can be readily caused to flow between the second main liquid chambers 40A, 40B and the auxiliary liquid chamber 30 by expansion and contraction of the auxiliary liquid chamber, and accordingly pressure fluctuations can be more efficiently absorbed. However, since the second main liquid chambers 40A, 40B are each independently placed in communication with the auxiliary liquid chamber 30, the second main liquid chambers 40A, 40B are not affected by each other, and the liquid movement is induced between the second main liquid chambers 40A, 40B and the auxiliary liquid chamber 30.

In a configuration in which the second main liquid chambers 40A, 40B are in communication with each other it is thought that the kinetic spring constant rises in a high frequency region as described above due to changes occurring in the volume of the auxiliary liquid chamber 30. Consequently, the present invention is particularly preferably applied to a configuration in which the second main liquid chambers 40A, 40B and the auxiliary liquid chamber are in communication with each other.

In the vibration isolation device 12 of the present exemplary embodiment of any of these configurations, the thin wall portions 42U are formed to each of the separation walls 42 sectioning the two second main liquid chambers 40A, 40B to perform release of the second main liquid chambers 40A, 40B pressure. Since there is no need to perform a process such as forming a through hole in the internal cylinder 22, manufacturing can be achieved at lower cost. In a configuration such as one in which a moveable rubber membrane is provided in a through hole of the internal cylinder 22 there are many limitations to the shape and size of the moveable rubber membrane. However, the degrees of freedom for the shape and size are increased by providing the thin wall portions 42U in the separation walls 42 as in the present exemplary embodiment, enabling pressure release in the axis-orthogonal direction to be reliably performed.

Fourth Exemplary Embodiment

Figure 12:
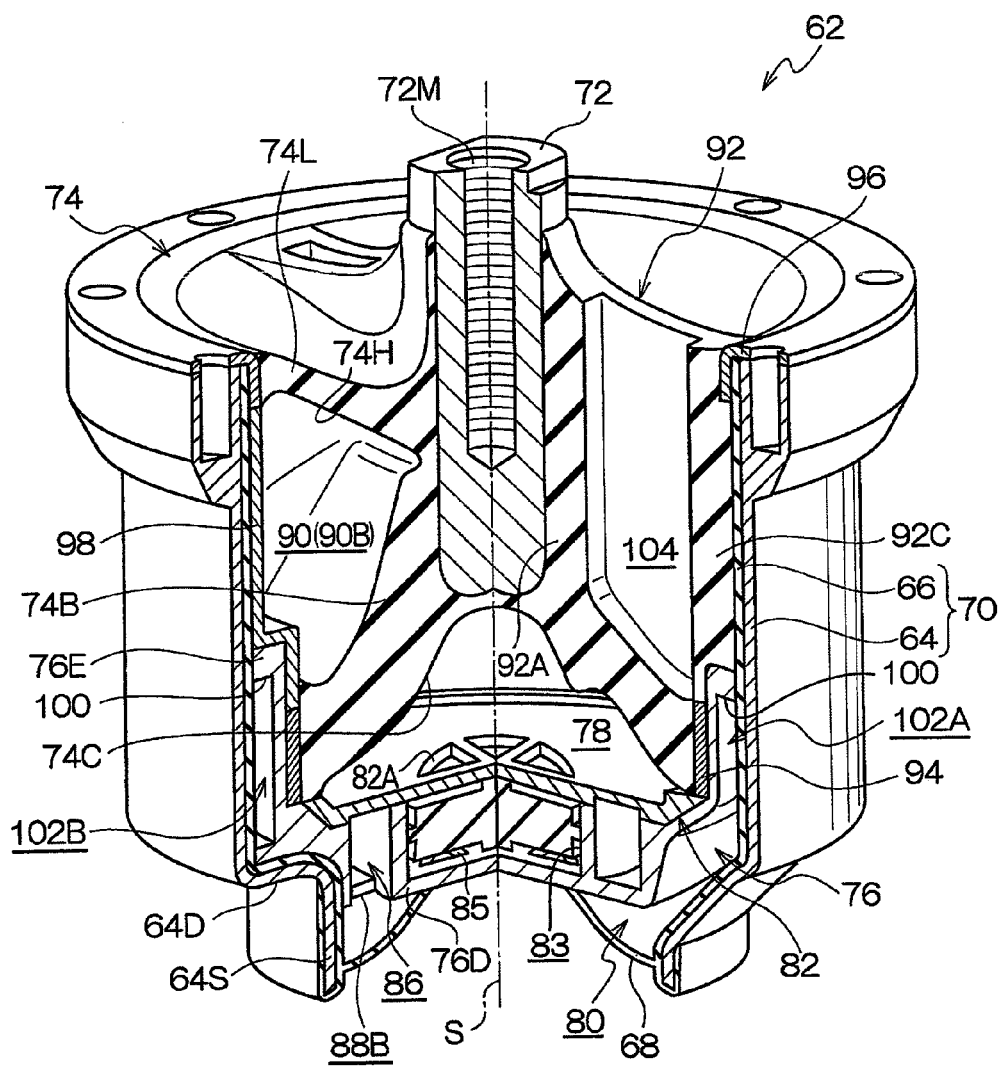
FIG. 12 is a perspective view illustrating a configuration of a vibration isolation device according to a fourth exemplary embodiment of the present invention, partially cut-away along the axial direction.

FIG. 12 illustrates a vibration isolation device 62 of a fourth exemplary embodiment of the present invention. The portions in the present exemplary embodiment similar to those of the first to the third exemplary embodiments are appended with the same reference numerals and detailed explanation thereof is omitted.

Figure 14:
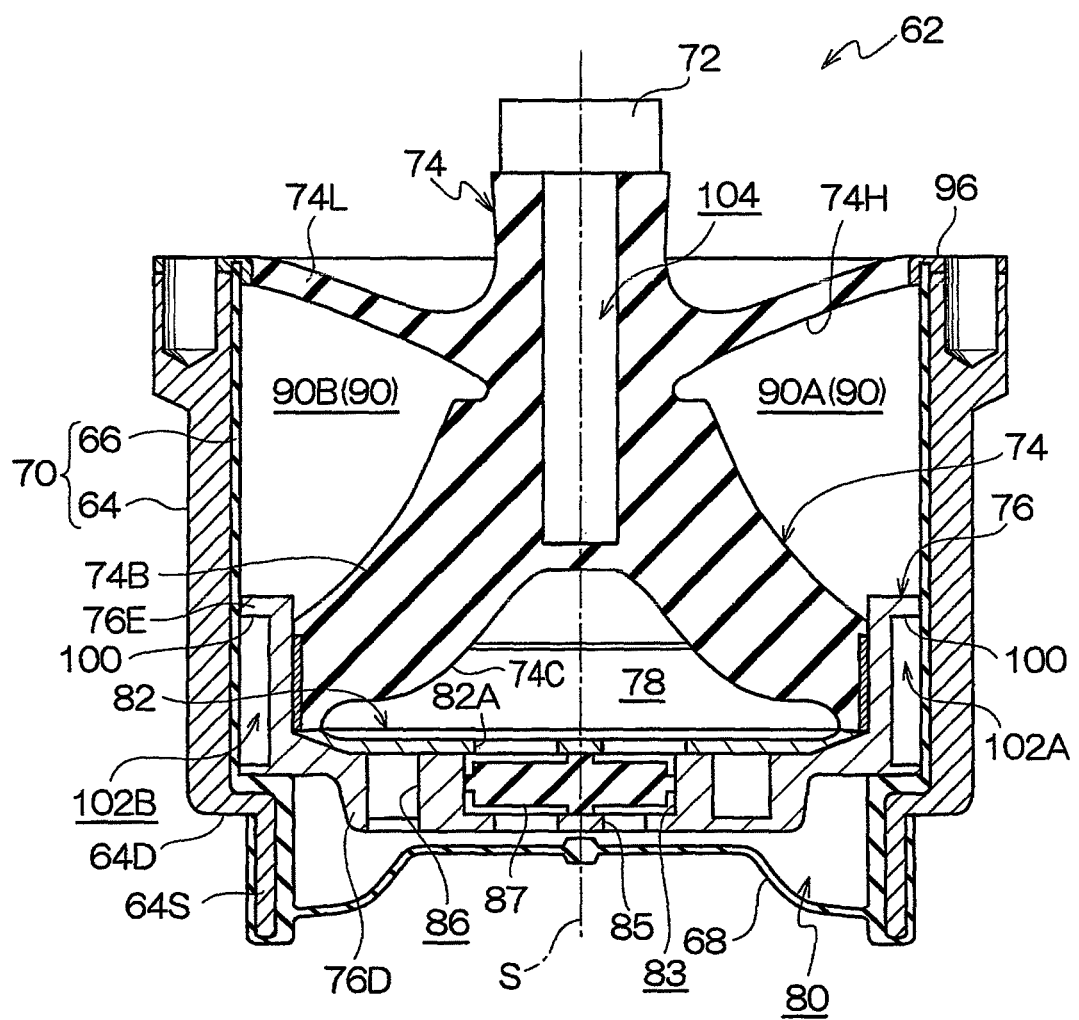
FIG. 14 is a cross-section illustrating a configuration of a vibration isolation device according to the fourth exemplary embodiment of the present invention, taken on line III-III of FIG. 13.
Figure 15:
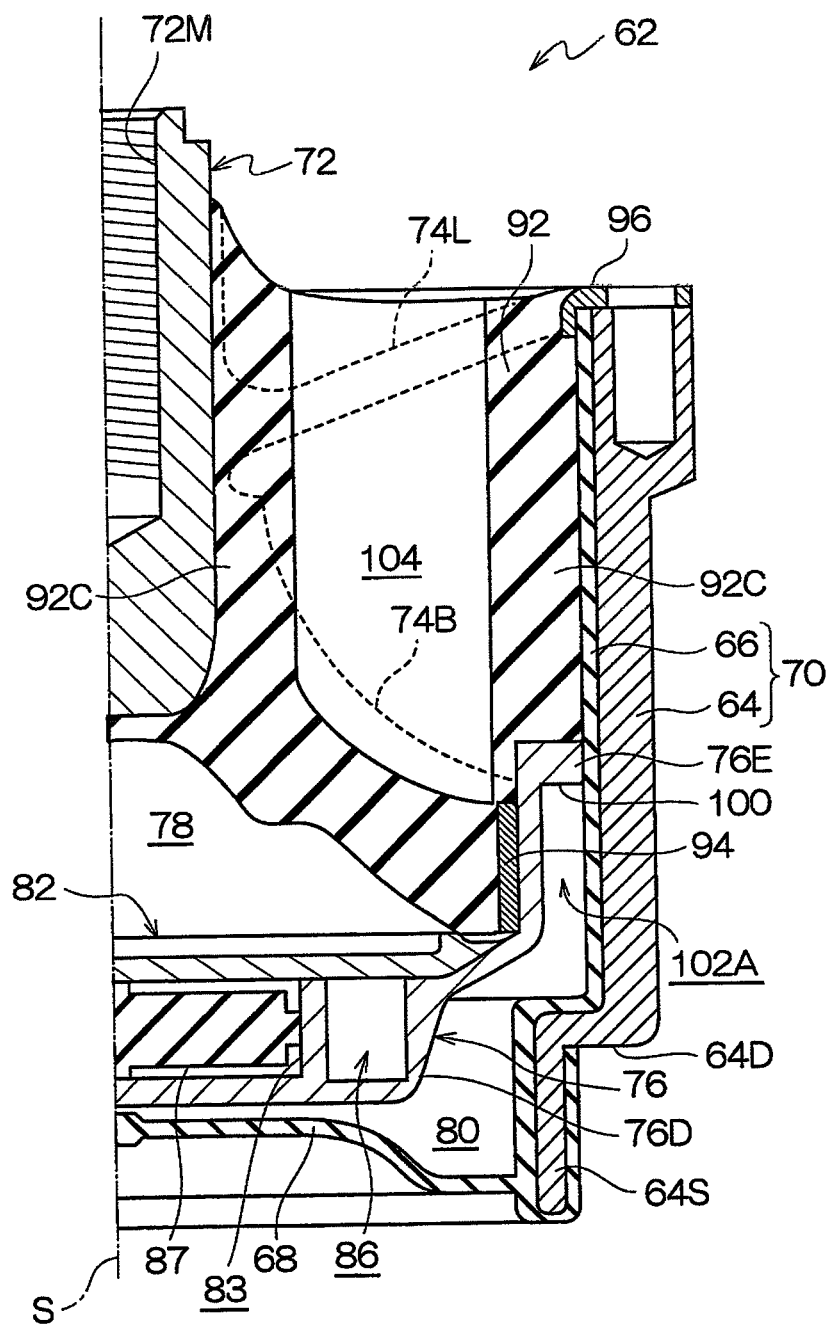
FIG. 15 is an axial direction cross-section of a configuration of a vibration isolation device according to the fourth exemplary embodiment of the present invention, taken at a different position to FIG. 14.

As shown in detail in FIG. 14 and FIG. 15, the vibration isolation device 62 includes a first attachment member 64 formed in a substantially circular cylindrical shape. A reduced diameter section 64S with reduced diameter is formed through a stepped section 64D at a location below the axial direction center of the first attachment member 64. A substantially circular cylindrical shaped covering rubber 66 is vulcanize bonded so as to cover over substantially all of the inner peripheral face of the first attachment member 64. The covering rubber 66 extends out from the bottom end of the reduced diameter section 64S towards the outside face.

A diaphragm 68 is integrally formed extending out towards the radial direction inside from the vicinity of the bottom end on the inner periphery of the covering rubber 66, so as to be covered on the reduced diameter section 64S side of the first attachment member 64. The diaphragm 68 is a membrane shaped member curved projecting out towards the top at a central portion of the diaphragm 68, so as to configure the auxiliary liquid chamber 80 between the diaphragm 68 and a circular cylinder orifice body 76, described later. The auxiliary liquid chamber 80 is expanded and contracted by deformation of the diaphragm 68 such that the volume of the auxiliary liquid chamber 80 changes.

Plural (for example 3) leg portions, not shown in the drawings, extend out towards the radial direction outside from the first attachment member 64. The vibration isolation device 62 is attached to a vehicle body by passing bolts through holes formed through the leading ends of the leg portions. Configuration may be made with a bracket fixed to the first attachment member 64 in place of (or in combination with) the leg portions, and the bracket employed for attaching the first attachment member 64 to the vehicle body.

A second attachment member 72 is disposed so as to be positioned on the axial center S at the radial direction inside of the first attachment member 64. The second attachment member 72 is formed in a circular pillar shape, and a female thread 72M is formed in an opening at the top side of the second attachment member 72. An engine is supported by the vibration isolation device 62 by, for example, a bolt on the engine side being screwed into the female thread 72M. The vibration isolation device 62 of the present exemplary embodiment exhibits an advantageous effect of attenuating vibration in the axis-orthogonal direction, however in a state in which no vibration is input the axial center of the second attachment member 72 and the axial center of the first attachment member 64 are aligned with each other.

A rubber resilient body 74 is disposed between the second attachment member 72 and the first attachment member 64. The rubber resilient body 74 has a rubber body portion 74B and a lid portion 74L. The rubber body portion 74B is coupled to the first attachment member 64 though a retaining cylinder 94 and the circular cylinder orifice body 76, described later.

The rubber body portion 74B is a main body portion of the rubber resilient body 74 with a truncated circular conical shape with a diameter that gradually widens as the rubber body portion 74B extends out from a lower side portion of the second attachment member 72 towards the circular cylinder orifice body 76. An indentation 74C is formed at the radial direction inside of the rubber body portion 74B.

A partitioning circular plate 82 is disposed below the indentation 74C. The partitioning circular plate 82 has a circular plate shape and covers the indentation 74C, such that a first main liquid chamber 78 is configured between the partitioning circular plate 82 and the rubber body portion 74B. The first main liquid chamber 78 is filled with a liquid (such as ethylene glycol or a silicone oil).

The lid portion 74L is provided above the rubber body portion 74B, with a diameter that gradually widens as the lid portion 74L integrally extends out towards the top end of the first attachment member 64. A recessed portion 74H is provided between the rubber body portion 74B and the lid portion 74L, and a liquid chamber 90 is provided between the recessed portion 74H and the first attachment member 64 (the covering rubber 66).

The circular cylinder orifice body 76 is disposed below the rubber body portion 74B and below the outer periphery of the rubber body portion 74B. The circular cylinder orifice body 76 includes a cylindrical shaped circular plate orifice portion 76D that has a thick substantially circular plate shape, and a circular cylindrical orifice portion 76E that has a substantially circular cylindrical shape and extends upwards from the outer periphery of the orifice circular plate portion 76D. The outside edge portion of the bottom face of the circular cylindrical orifice portion 76E is supported on the covering rubber 66 at the stepped portion 64D.

The orifice circular plate portion 76D is disposed below the partitioning circular plate 82. The auxiliary liquid chamber 80 is configured between the orifice circular plate portion 76D and the diaphragm 68. The auxiliary liquid chamber 80, similarly to the first main liquid chamber 78, is also filled with a liquid (for example ethylene glycol or a silicone oil). In particular a portion of the auxiliary liquid chamber 80 is configured by the diaphragm 68, so enabling a state to be achieved in which the auxiliary liquid chamber 80 is at near to atmospheric pressure due to deformation of the diaphragm 68 (and thereby causing liquid to flow in and out thereby).

A first orifice 86 is formed in the orifice circular plate portion 76D along the circumferential direction for about one turn. One end of the first orifice 86 is in communication with the first main liquid chamber 78 through a communication hole (not shown in the drawings) formed in the partitioning circular plate 82, and the other end of the first orifice 86 is in communication with the auxiliary liquid chamber 80 through a communication hole 88B (see FIG. 12) that is open downwards. The first orifice 86 accordingly configures a flow path permitting liquid to flow between the first main liquid chamber 78 and the auxiliary liquid chamber 80. In particular, the length and the cross-sectional area of the first orifice 86 are set as a flow path according to vibrations of a characteristic frequency range (for example shake vibration), and adjusted such that vibration energy can be absorbed by liquid movement between the first main liquid chamber 78 and the auxiliary liquid chamber 80.

A communication space 83 is formed at a central portion of the orifice circular plate portion 76D. The communication space 83 is configured with a circular shaped recessed portion open to the top side (the partitioning circular plate 82 side), and with plural communication holes 85 on the bottom face that pass through to the auxiliary liquid chamber 80. Plural communication holes 82A are formed in the partitioning circular plate 82 at positions corresponding to the communication space 83. The communication space 83 is in communication with the first main liquid chamber 78 and the auxiliary liquid chamber 80 through the communication holes 85 and the communication holes 82A.

A circular plate shaped vibration plate 87 is disposed in the communication space 83. The vibration plate 87 is capable of vibrating along the axial direction S inside the communication space 83.

Figure 13:
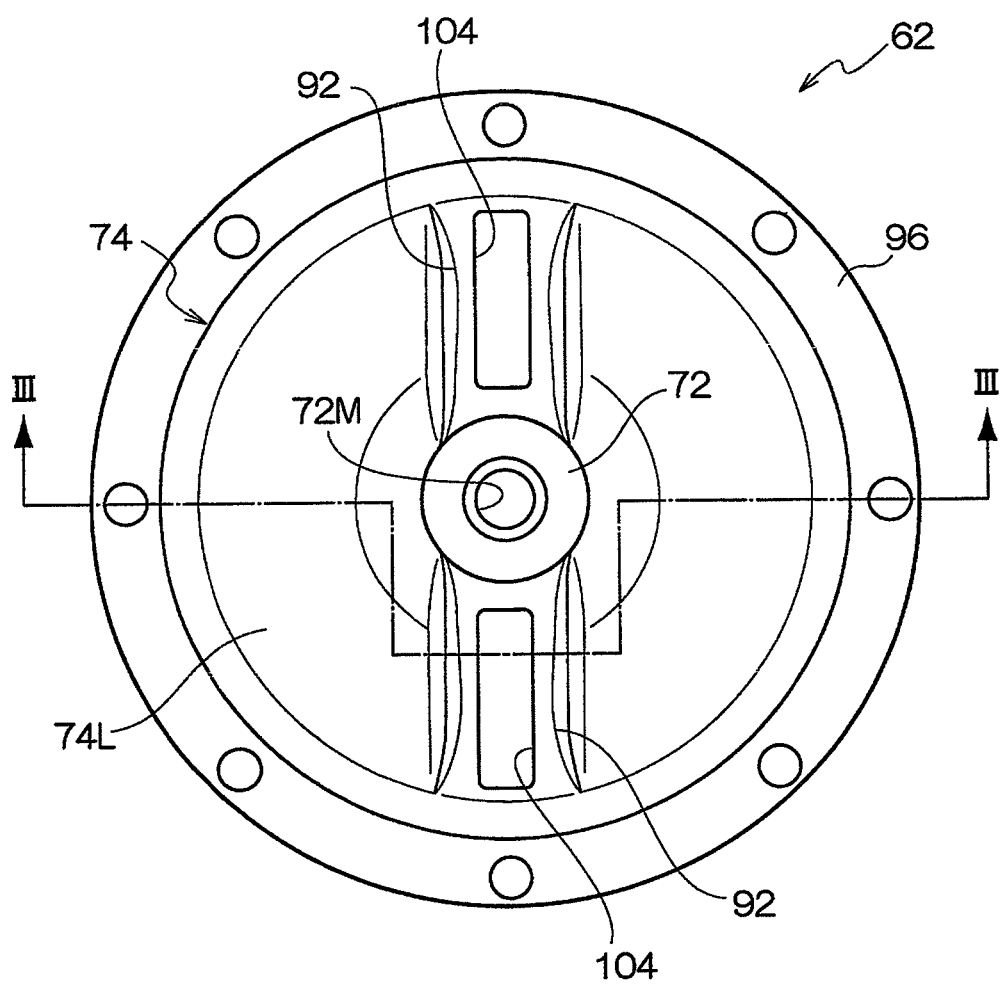
FIG. 13 is a plan view illustrating a configuration of a vibration isolation device according to a fourth exemplary embodiment of the present invention.
Figure 16:
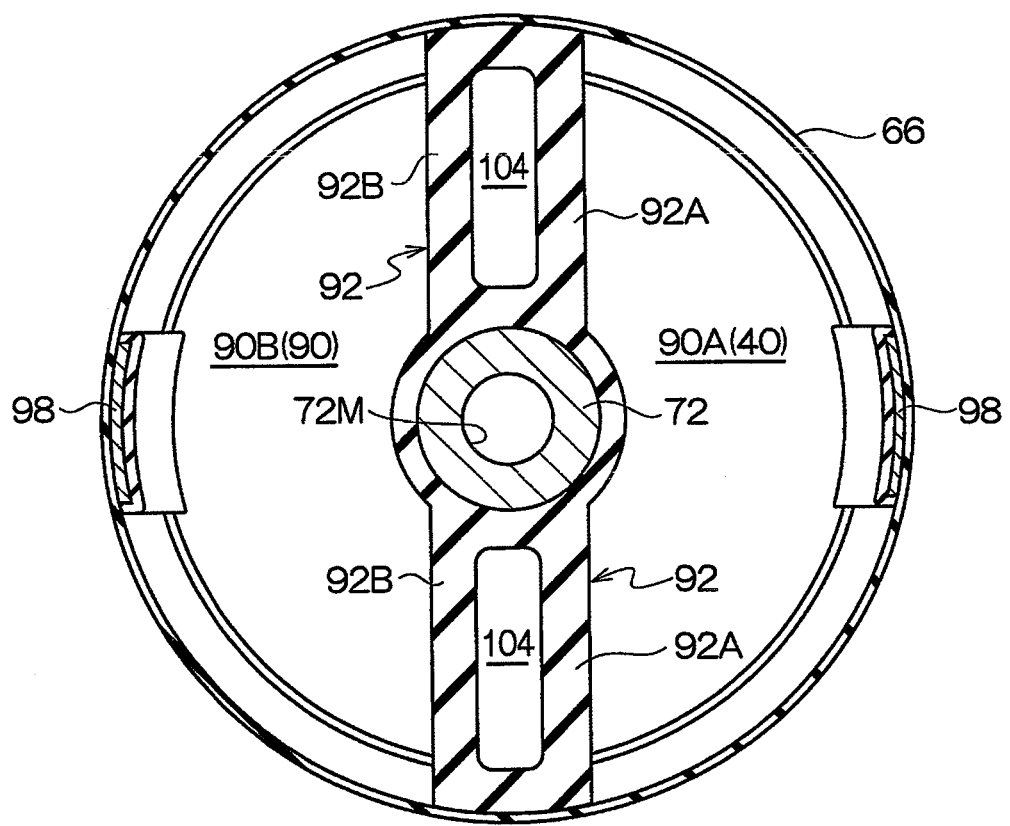
FIG. 16 is horizontal cross-section illustrating a configuration of a vibration isolation device according to the fourth exemplary embodiment of the present invention.

As shown in FIG. 13, FIG. 15 and FIG. 16, two separating walls 92 are formed between the rubber body portion 74B and the lid portion 74L, sectioning the liquid chamber 90 along the axial direction. The separating walls 92 are formed symmetrically about the axial center S, and are formed so as to integrally connect the lid portion 74L and the rubber body portion 74B. The radial direction outside ends of the separating walls 92 (the end portions on the side furthest from the axial center S) are in press contact with the inside of the first attachment member 64 (the covering rubber 16), as shown in FIG. 15 and FIG. 16. The liquid chamber 90 is sectioned into two second main liquid chambers 90A, 90B by the separating walls 92.

As shown in FIG. 12, the circular cylindrical shaped retaining cylinder 94 is vulcanize bonded to the outer peripheral face of the rubber body portion 74B of the rubber resilient body 74. The retaining cylinder 94 is press fitted at the inner periphery of the circular cylindrical orifice portion 76E of the circular cylinder orifice body 76, so as to couple together the rubber resilient body 74 and the circular cylinder orifice body

76. The circular cylinder orifice body 76 is press fitted inside the first attachment member 64 (the covering rubber 16). The first attachment member 64 is coupled to the rubber resilient body 74 through the retaining cylinder 94 and the circular cylinder orifice body 76.

A ring shaped retaining ring 96 is vulcanize bonded to the outer peripheral face of the lid portion 74L of the rubber resilient body 74. The retaining ring 96 has an upside down inverted L-shaped profile in cross-section open to the outside, and the inside top face of the curved portion of the retaining ring 96 is in close contact with the top face of the first attachment member 64. The retaining ring 96 is thereby fixed with respect to the first attachment member 64, and the lid portion 74L of the rubber resilient body 74 is fixed with respect to the first attachment member 64. As shown in FIG. 12, the retaining cylinder 94 and the retaining ring 96 are integrally coupled together by plural support plates 98 formed between the retaining cylinder 94 and the retaining ring 96. The integrated member formed in this manner is press fitted inside the first attachment member 64 (the covering rubber 16).

Two recessed grooves 100 are formed on the outer peripheral face of the circular cylindrical orifice portion 76E of the circular cylinder orifice body 76. One end of each of the recessed grooves 100 is in communication with the respective second main liquid chambers 90A, 90B, and the other end of each of the recessed grooves 100 is in communication with the auxiliary liquid chamber 80. Two second orifices 102A, 102B are formed in a portion where the recessed grooves 100 are formed between the circular cylindrical orifice portion 76E and the first attachment member 64 (the covering rubber 16), so as to be respectively aligned with the second main liquid chambers 90A, 90B. The second orifices 102A, 102B are flow paths permitting liquid to move to-and-fro between the respective second main liquid chambers 90A, 90B and the auxiliary liquid chamber 80. The length and the cross-sectional area of the second orifices 102A, 102B are set as flow paths according to vibrations of a characteristic frequency range, and adjusted such that the vibration energy can be absorbed by liquid movement between the second main liquid chambers 90A, 90B and the auxiliary liquid chamber 80. In particular the set frequency in the second orifices 102A, 102B is higher than the set frequency of the first orifice 86.

The circular cylinder orifice body 76 has the orifice circular plate portion 76D covered by the partitioning circular plate 82, and the first orifice 86 is formed towards the inner peripheral side. The second orifices 102A, 102B are formed between the recessed grooves 100 on the outer peripheral face of the circular cylindrical orifice portion 76E and the first attachment member 64 (the covering rubber 16). Forming two separate orifices along the circumferential direction, at the inside and the outside, raises the mutual degrees of freedom for the shapes of the orifices, and enables for example sufficient length of path to be secured as a liquid flow path.

Figure 17:
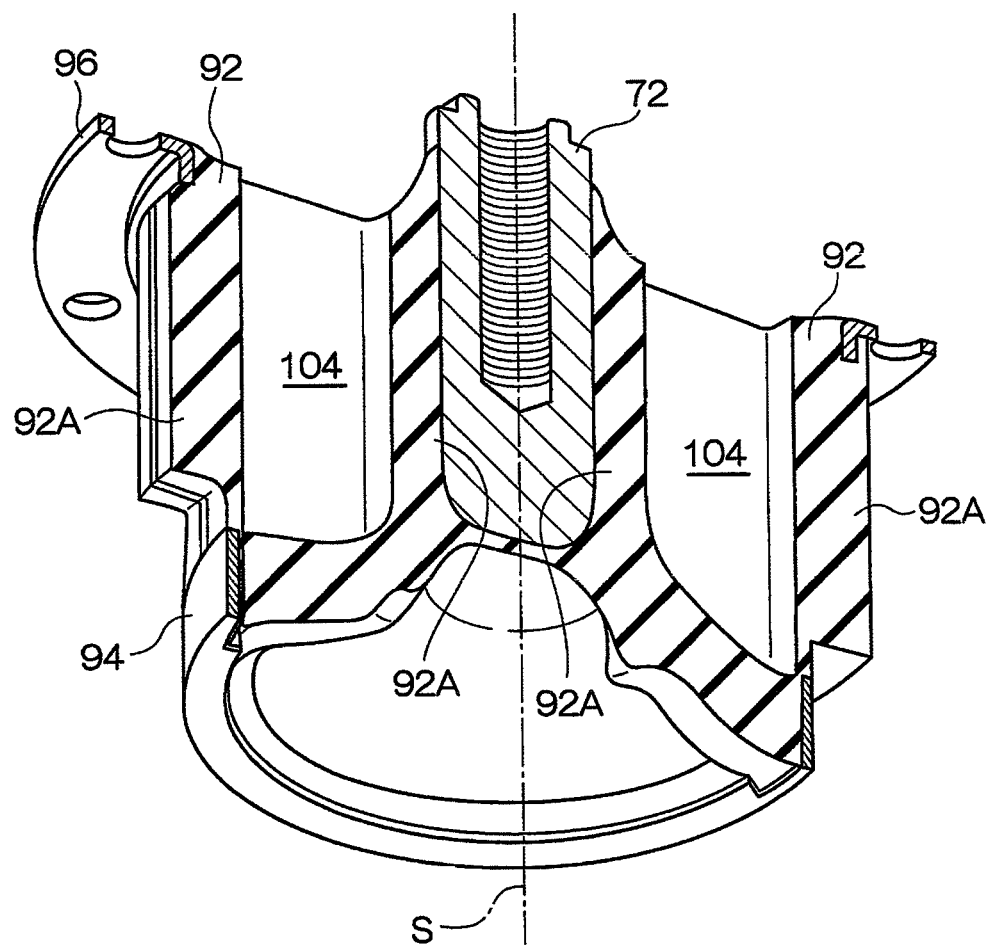
FIG. 17 is a perspective view illustrating an internal configuration of a vibration isolation device according to the fourth exemplary embodiment of the present invention, partially cut-away along the axial direction.

As shown in FIG. 13, FIG. 16 and FIG. 17, a thickness direction central portion of each of the separating walls 92 is configured with a hollow portion 104. The hollow portions 104 are open towards the top but are not open on the first main liquid chamber 78 side, and have a recessed profile with an elongated rectangular cross-section along the radial direction as viewed from above the axial center S. By forming the hollow portions 104 in this manner the separating walls 92 split at these portions into two thin walls 92A, 92B that form the faces of the two second main liquid chambers 90A, 90B. The hollow portions 104 are open to the atmosphere and are at atmospheric pressure.

Portions of the separating walls 92 other than the thin walls 92A, 92B configure thick walls 92C that are relatively thick. The thick walls 92C are formed at the radial direction inside and outside of the separating walls 92 and are continuous from the top end (the lid portion 74L) to the bottom end (the rubber body portion 74B).

The thickness of the thin walls 92A, 92B is set so as to be able to alleviate pressure fluctuations by the thin walls 92A, 92B deforming when relative pressure fluctuations occur between the second main liquid chamber 90A and the second main liquid chamber 90B at a high frequency of a specific value or greater (for example about the frequency where the second orifices 102A, 102B become blocked). In contrast, the thickness of the thick walls 92C is set such that the separating walls 92 reliably press against the covering rubber 16 and make a liquid tight seal between the separating walls 92 and the covering rubber 16, the lid portion 74L is reliably supported, and such that when there is relative movement between the second attachment member 72 and the first attachment member 64, a resistance force can be exhibited to counter the relative movement such that efficient dissipation of energy of the relative movement can be achieved by internal friction.

Explanation follows regarding operation of the vibration isolation device 62 of the present exemplary embodiment. When an engine is switched on, vibration from the engine is transmitted to the rubber resilient body 74 through the second attachment member 72. When this occurs the rubber resilient body 74 acts as a vibration absorbing body and absorbs input vibration by an attenuating action, due for example to internal friction accompanying deformation of the rubber resilient body 74.

An example follows in which the main vibrations input to the vibration isolation device 62 from the engine are vibration (primary vibration) generated within the engine due to pistons performing reciprocating movement in the engine, and vibration (secondary vibration) occurring due to changes in the rotation speed of the crankshaft in the engine. There is also vibration input to the vibration isolation device 62 from the vehicle side in the vicinity of the primary vibration and secondary vibration. The rubber resilient body 74 is capable of absorbing vibration through attenuating action, by for example internal friction, both when the input vibration is the primary vibration and the secondary vibration. In practice a vibration that is a combination of the primary vibration and the secondary vibration acts on the vibration isolation device 62, however for simplicity explanation follows of the vibration isolation device 62 separately for each of these vibrations. As an example of the disposed orientation of the vibration isolation device 62, the primary amplitude direction (primary vibration input direction) is taken as being aligned with the axial direction of the vibration isolation device 62, and the secondary amplitude direction (secondary vibration input direction) is taken as being aligned with the axis-orthogonal direction of the vibration isolation device 62.

Explanation follows first regarding when the primary vibration is input to the vibration isolation device 62

In the vibration isolation device 62 of the present exemplary embodiment, the first main liquid chamber 78 is in communication with the auxiliary liquid chamber 80 through the first orifice 86. Accordingly, when the primary vibration is input to the second attachment member 72 from the engine side, the rubber resilient body 74 resiliently deforms along the primary amplitude direction, and the internal volume of the first main liquid chamber 78 expands and contracts. Liquid accordingly flows through the first orifice 86 between the first main liquid chamber 78 and the auxiliary liquid chamber 80 in synchronization with the input vibration.

The path length and the cross-sectional area of the first orifice 86 are set according to the frequency of a characteristic input vibration (for example a shake vibration). A resonance phenomenon (liquid column resonance) therefore occurs in the liquid flowing to-and-fro between the first main liquid chamber 78 and the auxiliary liquid chamber 80 through the first orifice 86 when the main vibration input is the shake vibration. Particularly efficient absorption can accordingly be achieved of input vibration in the primary amplitude direction due to pressure fluctuations and viscous resistance of the liquid accompanying liquid column resonance.

When the frequency of input vibration in the primary amplitude direction is high, the first orifice 86 enters a blocked state with liquid flow impeded, and the vibration plate 87 is vibrated in the communication space 83 along the axial direction S by vibration transmitted to the liquid in the first main liquid chamber 78. Accordingly, the pressure in the first main liquid chamber 78 can be suppressed from rising, the kinetic spring constant of the vibration isolation device 62 can be suppressed from rising, and vibration in a high frequency region can also be efficiently absorbed.

Figure 18:
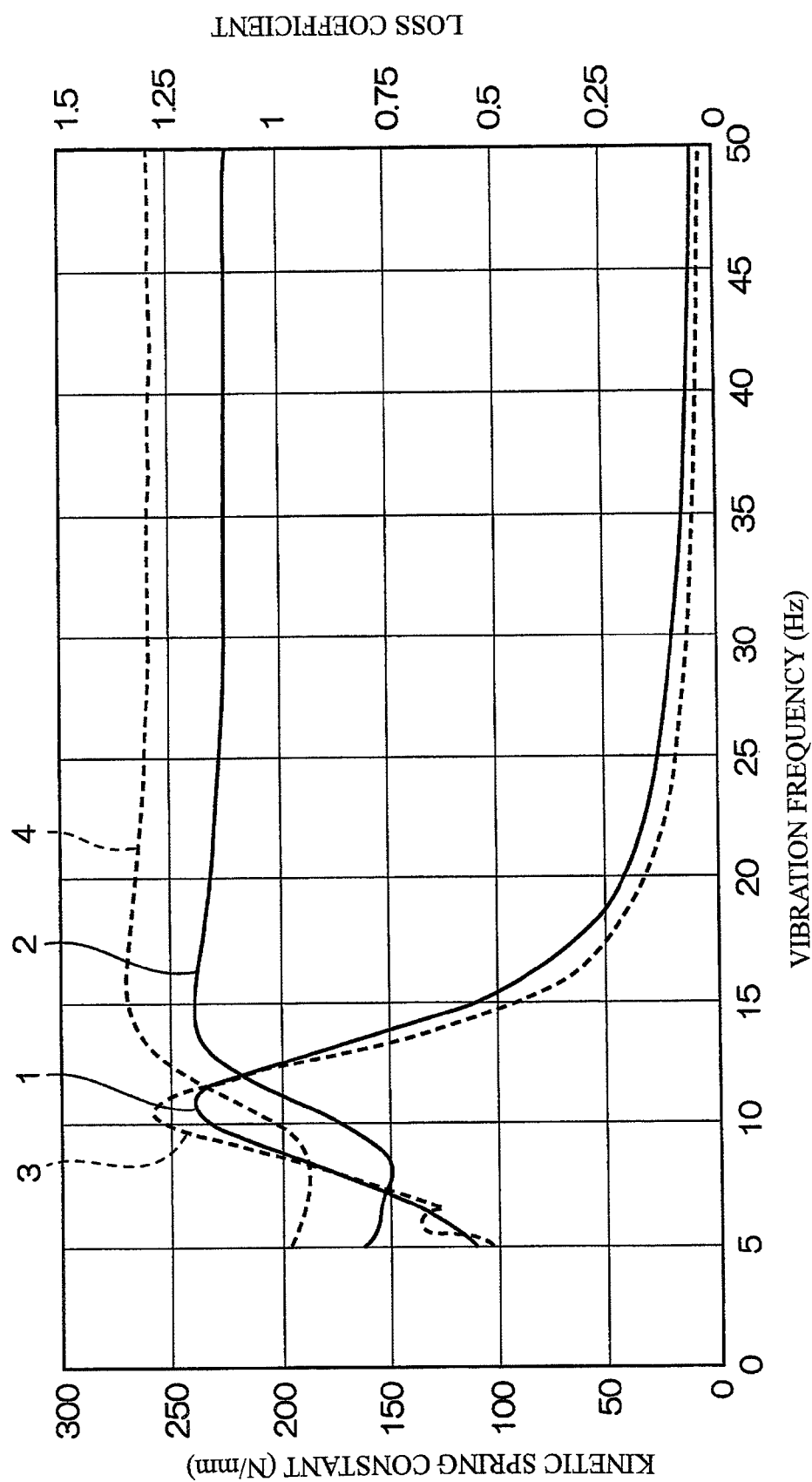
FIG. 18 is a graph illustrating relationships of kinetic spring constants and loss coefficients against frequency of input acting in the axial direction on a vibration isolation device according to the fourth exemplary embodiment of the present invention and a vibration isolation device of a comparative example.
Figure 19:
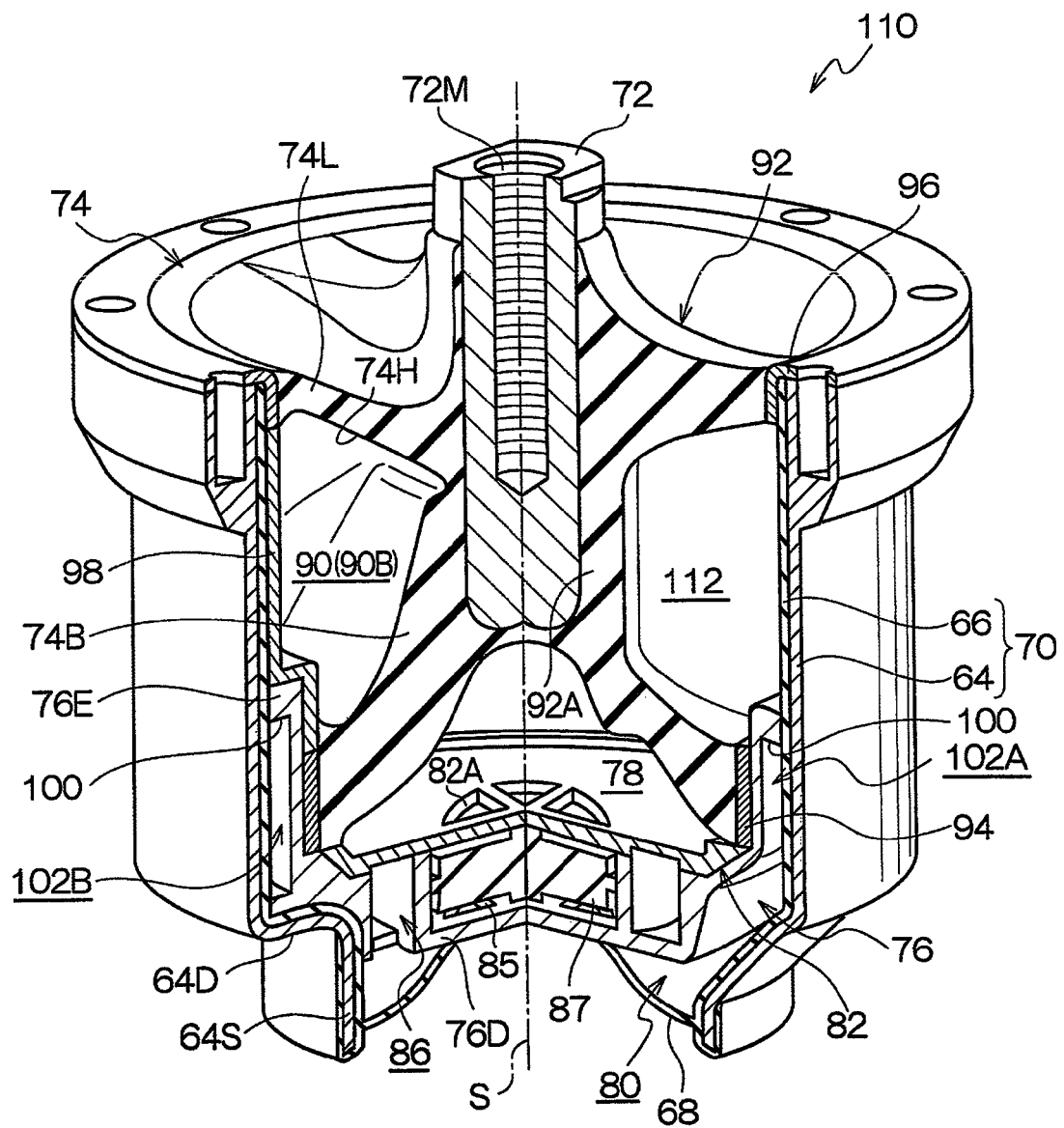
FIG. 19 is a perspective view illustrating a configuration of a vibration isolation device according to a fifth exemplary embodiment of the present invention, partially cut-away along the axial direction
Figure 20:
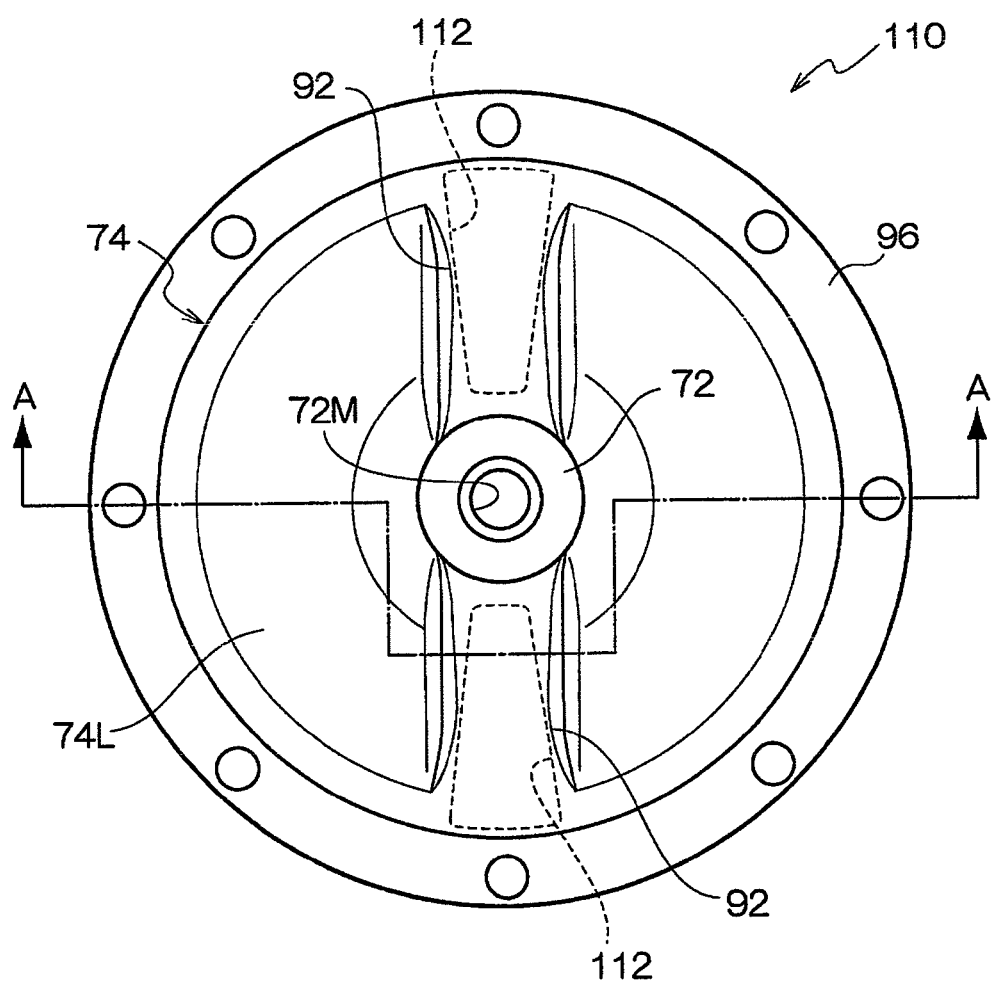
FIG. 20 is a cross-section illustrating a configuration of a vibration isolation device according to the fifth exemplary embodiment of the present invention, taken on line A-A of FIG. 19.
Figure 21:
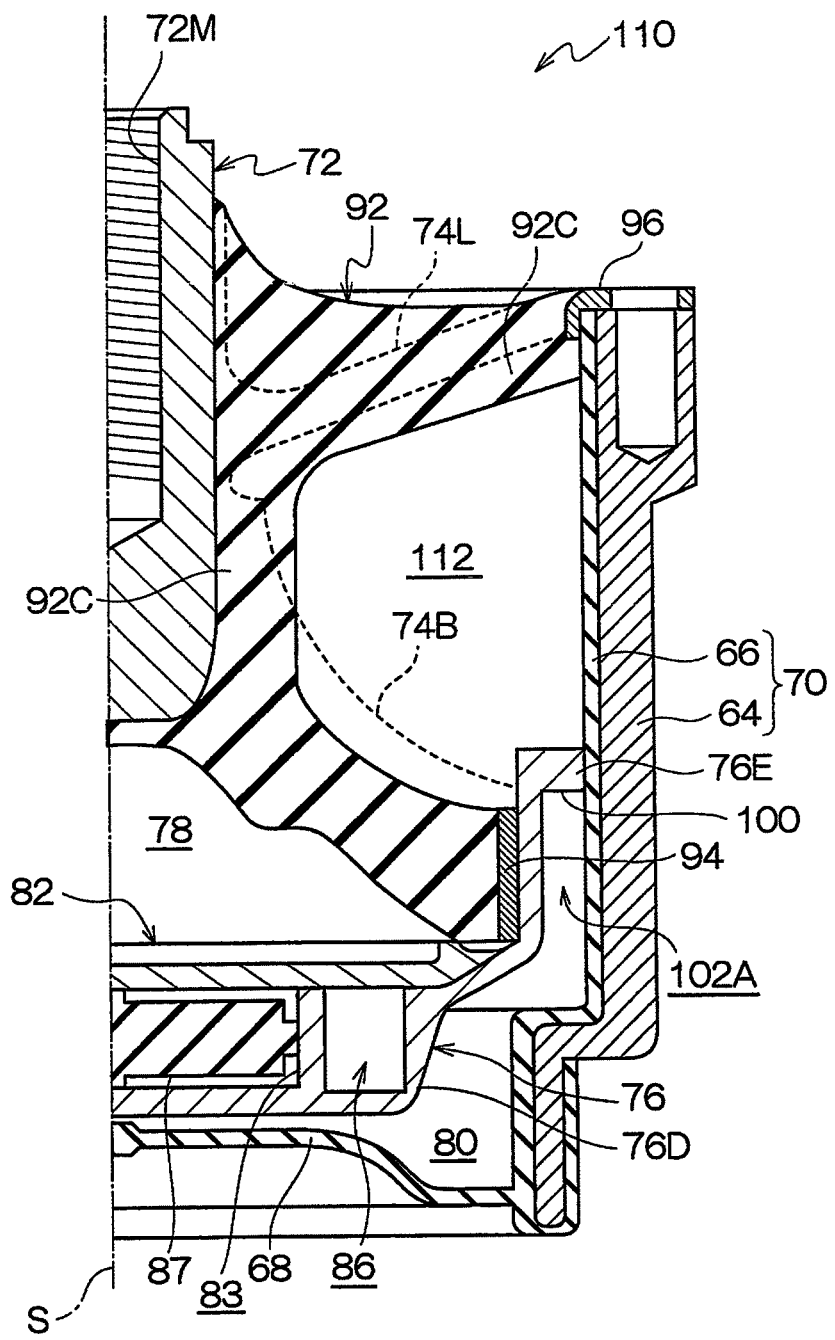
FIG. 21 is an axial direction cross-section of a configuration of a vibration isolation device according to the fifth exemplary embodiment of the present invention, taken at a different position to FIG. 20.
Figure 22:
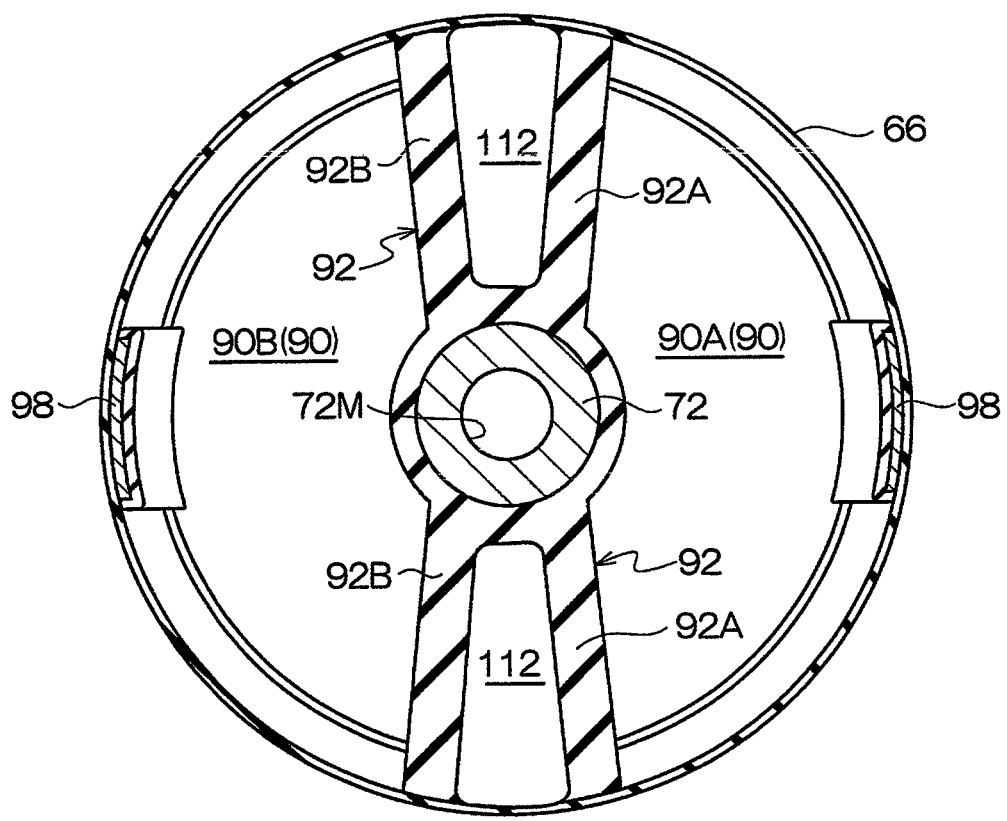
FIG. 22 is horizontal cross-section illustrating a configuration of a vibration isolation device according to the fifth exemplary embodiment of the present invention.
Figure 23:
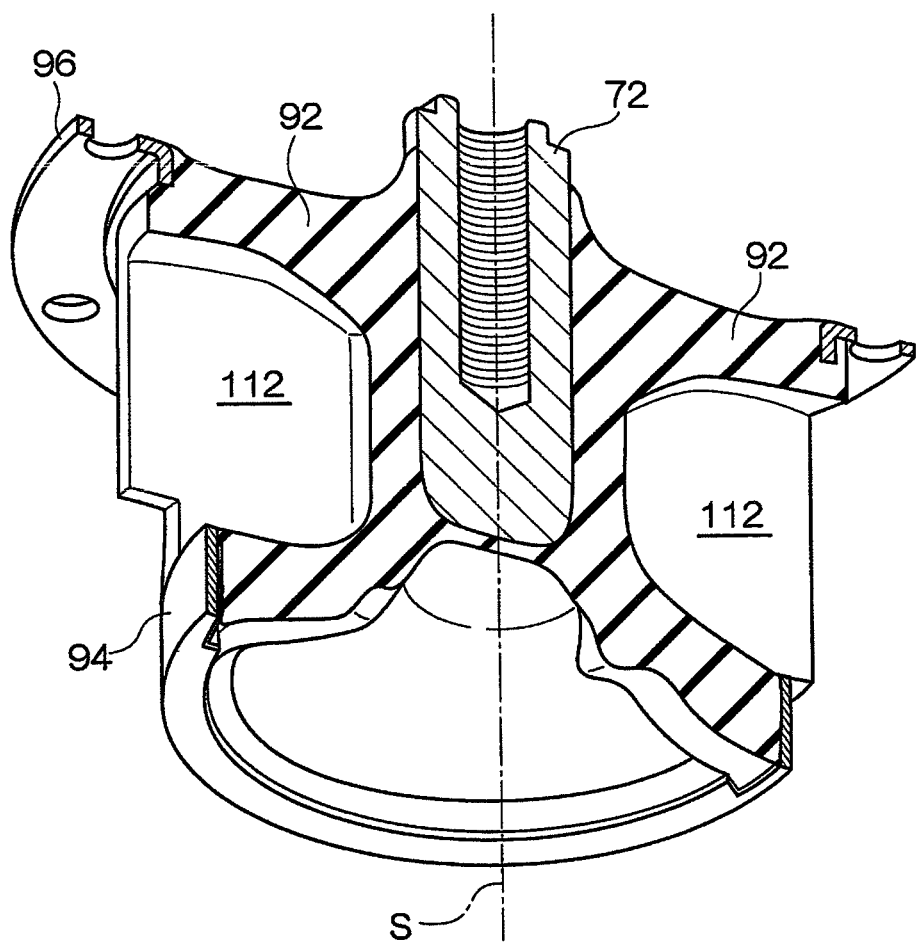
FIG. 23 is a perspective view illustrating an internal configuration of a vibration isolation device according to the fifth exemplary embodiment of the present invention, partially cut-away along the axial direction.

Explanation follows regarding input of secondary vibration to the vibration isolation device 62, with reference to the graph in FIG. 18. This graph illustrates an example of a relationship between the kinetic spring constant and loss coefficient of the vibration isolation device 62 for frequencies of input vibration at amplitudes from ±0.1 mm to ±0.2 mm acting along the axis-orthogonal direction. An example is also shown of a relationship under the same conditions as above between the kinetic spring constant and loss coefficient for a vibration isolation device of a comparative example having the same structure as the vibration isolation device 62 of the present exemplary embodiment, except that portions (hollow portions 104) corresponding to the thin walls 92A, 92B of the present exemplary embodiment are not formed in the separating walls 92. In the graph the loss coefficient (result 1) and the kinetic spring constant (result 2) of the vibration isolation device 62 of the present exemplary embodiment are shown by solid lines, and the loss coefficient (result 3) and the kinetic spring constant (result 4) of the vibration isolation device of the comparative example are shown by intermittent lines.

In the vibration isolation device 62 of the present exemplary embodiment, the second main liquid chambers 90A, 90B are respectively in communication with the auxiliary liquid chamber 80 through the second orifices 102A, 102B. Accordingly, when a secondary vibration is input to the second attachment member 72 from the engine side, the rubber resilient body 74 resiliently deforms along the secondary amplitude direction, and the internal volumes of the second main liquid chambers 90A, 90B are expanded and contracted. Liquid accordingly flows to-and-fro through the second orifices 102A, 102B between the second main liquid chambers 90A, 90B and the auxiliary liquid chamber 80 in synchronization with the input vibration.

The path length and the cross-sectional area of the second orifices 102A, 102B are set according to the frequency of a characteristic input vibration. A resonance phenomenon (liquid column resonance) accordingly occurs in the liquid flowing to-and-fro through the second orifices 102A, 102B between the second main liquid chambers 90A, 90B and the auxiliary liquid chamber 80. The input vibration in the secondary amplitude direction can accordingly be particularly efficiently absorbed by pressure fluctuations and viscous resistance accompanying the liquid column resonance. As shown in FIG. 18, the vibration isolation device 62 of the present exemplary embodiment obtains greater attenuation of vibration at frequencies of about 10 Hz to 12 Hz than the vibration isolation device of the comparative example.

In the present exemplary embodiment, the second main liquid chamber 90A and the second main liquid chamber 90B are separated by the thin walls 92A, 92B. Accordingly, the thin walls 92A, 92B of the separating walls 92 vibrate in synchronization with the input vibration when the frequency of the input vibration in the secondary amplitude direction is high. The kinetic spring constant can thereby be suppressed from rising along with fluctuations in liquid pressure in the second main liquid chambers 90A, 90B. Namely, it can be seen by comparing the solid line 2 (present exemplary embodiment) and the intermittent line 4 (the comparative example) in the graph shown in FIG. 18 that the kinetic spring constant is lower in the present exemplary embodiment than in the comparative example. Namely, in the present exemplary embodiment, the kinetic spring constant of the vibration isolation device 62 remains low in the secondary amplitude direction, in particular when high frequency vibrations are input, and a vibration damping effect can be obtained.

In the vibration isolation device 62 of the present exemplary embodiment the thin walls 92A, 92B are formed in the separating walls 92. However, since the shapes of the rubber body portion 74B and other portions have not been changed, there is little impact on the performance of the vibration isolation device 62 overall, and so the vibration isolation device 62 can still maintain the high vibration damping performance originally demanded.

Fifth Exemplary Embodiment

Explanation follows regarding a fifth exemplary embodiment of the present invention. Portions in the present exemplary embodiment similar to those of the first to the fourth exemplary embodiments are allocated the same reference numerals, and further detailed explanation is omitted. In a vibration isolation device 110 of the present exemplary embodiment, transverse hollow portions 112 are configured in place of the hollow portions 104 of the vibration isolation device 62 of the fourth exemplary embodiment. Other portions of the configuration other than the transverse hollow portions 112 are similar to those of the vibration isolation device 62 of the fourth exemplary embodiment.

As shown in FIG. 19 to FIG. 23, the transverse hollow portions 112 are configured in thickness direction central portions of respective separating walls 92. The transverse hollow portions 112 are open towards the radial direction outside, and are not open towards the first main liquid chamber 78 side or towards the top side in the axial direction S. The transverse hollow portions 112 are accordingly formed as rectangular cross-section recessed portions, elongated along the axial direction S. By forming the transverse hollow portions 112 in this manner the separating walls 92 are split at the portions into two thin walls 92A, 92B that form the faces of the two second main liquid chambers 90A, 90B. Holes, not shown in the drawings, are formed in the first attachment member 64 at portions corresponding to the transverse hollow portions 112. The transverse hollow portions 112 are open to the atmosphere and are at atmospheric pressure. Portions of the separating walls 92 other than the thin walls 92A, 92B configure thick walls 92C that are relatively thick.

The thickness of the thin walls 92A, 92B is set so as to be able to alleviate pressure fluctuations by the thin walls 92A, 92B deforming when relative pressure fluctuations occur between the second main liquid chamber 90A and the second main liquid chamber 90B at a high frequency of a specific value or greater (for example about the frequency where the second orifices 102A, 102B become blocked).

Similarly to the vibration isolation device 62 of the fourth exemplary embodiment, the vibration isolation device 110 of the present exemplary embodiment is also able to exhibit a vibration damping effect to vibrations in the primary amplitude direction and vibrations in the secondary amplitude direction.

It is possible to replace the circular cylindrical orifice body 26 and the partitioning plate 32 of the first to the third exemplary embodiments with the circular cylinder orifice body 76 and the partitioning circular plate 82 of the fourth and fifth exemplary embodiments. It is also possible to replace the circular cylinder orifice body 76 and the partitioning circular plate 82 of the fourth and fifth exemplary embodiments with the circular cylindrical orifice body 26 and partitioning plate 32 of the first to the third exemplary embodiments.

The invention claimed is:

1. A vibration isolation device comprising:
    a first attachment member formed in a tubular shape and coupled to a vibration generating unit or to a vibration receiving unit;
    a second attachment member coupled to the other of the vibration generating unit or the vibration receiving unit and disposed at the inner peripheral side of the first attachment member;
    a resilient body disposed between the first attachment member and the second attachment member and coupled to the first attachment member and the second attachment member;
    a partitioning member configuring a first main liquid chamber between the partitioning member and the resilient body in a main vibration input direction first end side of the second attachment member, the first main liquid chamber filled with a liquid from and the internal volume of the first main liquid chamber changing along with resilient deformation of the resilient body;
    a diaphragm member configuring an auxiliary liquid chamber between the diaphragm member and the partitioning member, the auxiliary liquid chamber filled with liquid and the internal volume of the auxiliary liquid chamber changing according to liquid pressure fluctuations;
    a first restricting through path enabling liquid to move between the first main liquid chamber and the auxiliary liquid chamber;
    a recess portion provided to the resilient body and configuring a liquid chamber between the recess portion and the first attachment member;
    a separating wall sectioning the liquid chamber into a plurality of second main liquid chambers in a row along a direction orthogonal to the axial direction of the first attachment member;
    a second restricting through path enabling liquid to move in-between the plurality of second main liquid chambers and/or between each of the second main liquid chambers and the auxiliary liquid chamber; and
    pressure difference reduction portion that reduces the pressure difference between the first main liquid chamber and the second main liquid chambers,
    wherein the pressure difference reduction portion is provided to the separating wall, and
    wherein the pressure difference reduction portion is configured in the separating wall by thin walled portions on both sides of a hollowed-out space formed by thinning from a thickness direction central portion of the separating wall out towards the first main liquid chamber, the hollowed-out space being in communication with the first main liquid chamber.

2. The vibration isolation device of claim 1 wherein the resilient body is formed in a truncated circular conical shape with a diameter that gradually widens as the resilient body extends out from the second attachment member towards the partitioning member, and the resilient body comprises:
    a circular conical portion that partitions between the first main liquid chamber and the second main liquid chambers and attenuates vibration by resilient deformation due to relative vibration in the axial direction of the first attachment member and the second attachment member; and
    a lid portion configuring a lid to the liquid chamber and extends from the second attachment member towards the radial direction outside at the opposite side to the partitioning member as viewed from the circular conical portion; and
    the pressure difference reduction portion is configured as a locally thinned portion in the circular conical portion.

3. The vibration isolation device of claim 1 wherein:
    the second attachment member is formed with a communication hole communicating the first main liquid chamber with the second main liquid chambers; and
    the pressure difference reduction portion is configured by a thin membrane portion formed by the resilient body and partitioning the communication hole into a first main liquid chamber side and a second main liquid chambers side.

4. The vibration isolation device of claim 1, wherein the partitioning member is configured from a high rigidity partitioning member that does not deform due to pressure difference between the first main liquid chamber and the second main liquid chambers.

5. The vibration isolation device of claim 4 wherein the first restricting through path is formed at a peripheral inside and the second restricting through path is formed at a peripheral outside relative to each other in the high rigidity partitioning member.

6. The vibration isolation device of claim 1 wherein the pressure difference reduction portion is configured by an open hollow portion formed to an internal portion of the separating wall so as not to be in communication with the first main liquid chamber or with the second main liquid chambers.

7. The vibration isolation device of claim 6 wherein the hollow portion is configured by a recessed portion that has a recessed shape in the main vibration input direction and is open to the second attachment member side.

8. The vibration isolation device of claim 6 wherein the hollow portion is configured by a recessed portion that has a recessed shape in a direction orthogonal to the main vibration input direction and is open to the first attachment member side.

* * * * *